(12) United States Patent
Thiruppathi

(10) Patent No.: US 11,300,811 B2
(45) Date of Patent: Apr. 12, 2022

(54) EYEGLASS SUSPENSION DEVICE AND METHOD OF MOVING EYEGLASSES OFF THE NOSE UTILIZING THE SAME

(71) Applicant: Devaraj Thiruppathi, Columbus, GA (US)

(72) Inventor: Devaraj Thiruppathi, Columbus, GA (US)

( * ) Notice: Subject to any disclaimer, the term of this patent is extended or adjusted under 35 U.S.C. 154(b) by 196 days.

(21) Appl. No.: 16/718,949

(22) Filed: Dec. 18, 2019

(65) Prior Publication Data

US 2021/0191147 A1 Jun. 24, 2021

(51) Int. Cl.
*G02C 3/00* (2006.01)

(52) U.S. Cl.
CPC .................... *G02C 3/003* (2013.01)

(58) Field of Classification Search
CPC ............. G02C 3/003; G02C 3/02; G02C 3/00
See application file for complete search history.

(56) References Cited

U.S. PATENT DOCUMENTS

| | | |
|---|---|---|
| 2,541,493 A | 2/1951 | Barroso |
| 3,955,885 A | 5/1976 | Aronsohn |
| 4,179,753 A | 12/1979 | Aronberg et al. |
| 4,793,702 A | 12/1988 | Ahrens et al. |
| 4,834,524 A | 5/1989 | Borsos |
| 4,844,605 A | 7/1989 | Peterson et al. |
| 5,002,381 A | 3/1991 | Murrell |
| 5,123,115 A | 6/1992 | Braswell-Moore |
| 5,239,320 A | 8/1993 | Allendorf et al. |
| 5,355,185 A | 10/1994 | Lee |
| 5,471,258 A | 11/1995 | Hsieh |
| 5,790,228 A | 8/1998 | Bell, III |
| 6,000,795 A | 12/1999 | Van Rysselberghe |
| 6,142,623 A | 11/2000 | Jones |
| 6,450,640 B1 | 9/2002 | Van Rysselberghe |
| 6,470,896 B1 | 10/2002 | Mensonides |
| 6,745,396 B1 | 6/2004 | Landis et al. |
| 7,665,154 B2 | 2/2010 | Gerstel Costello |
| 7,686,449 B2 | 3/2010 | Jannard et al. |
| 8,152,298 B2 | 4/2012 | Frank |
| 8,209,778 B2 | 7/2012 | Matsumoto |

(Continued)

FOREIGN PATENT DOCUMENTS

| | | |
|---|---|---|
| WO | 2007141514 | 12/2007 |
| WO | 2019143670 | 7/2019 |

*Primary Examiner* — Cara E Rakowski
(74) *Attorney, Agent, or Firm* — Sand, Sebolt & Wernow Co., LPA

(57) ABSTRACT

A device and method for lifting eyeglasses off a person's nose and supporting at least some of the weight of the eyeglasses. The device includes a base encircling part of the person's head. At least one support extends from the base and operatively engages an arm of the eyeglasses. The at least one support includes first and second front supports and first and second temporal supports. Each arm of the eyeglasses rests on an upper surface of one of the first and second front supports and under a lower surface of one of the first and second temporal supports. Each arm is counterbalanced between the associated front support and temporal support and is therefore lifted upwardly or forwardly off the person's nose and/or ears. The base may be adjustable in length. The position of the first and second temporal supports on the base may also be adjustable.

19 Claims, 30 Drawing Sheets

(56) References Cited

U.S. PATENT DOCUMENTS

| | | |
|---|---|---|
| 8,523,350 B2 | 9/2013 | Krisik et al. |
| 8,733,926 B2 | 5/2014 | Stewart |
| D706,979 S | 6/2014 | Curbeon |
| 9,195,076 B2 | 11/2015 | Kavana |
| 9,234,654 B1 | 1/2016 | Wang |
| 9,417,459 B2 | 8/2016 | Oram |
| 9,470,905 B1 | 10/2016 | Alcaraz |
| 9,486,049 B2 | 11/2016 | Purkey |
| 9,579,060 B1 | 2/2017 | Lisy et al. |
| 9,734,402 B2 | 8/2017 | Jang et al. |
| 9,853,672 B2 | 12/2017 | Ko et al. |
| 9,874,754 B2 | 1/2018 | Ko et al. |
| 2020/0341293 A1* | 10/2020 | Suh .................. G02C 3/003 |

* cited by examiner

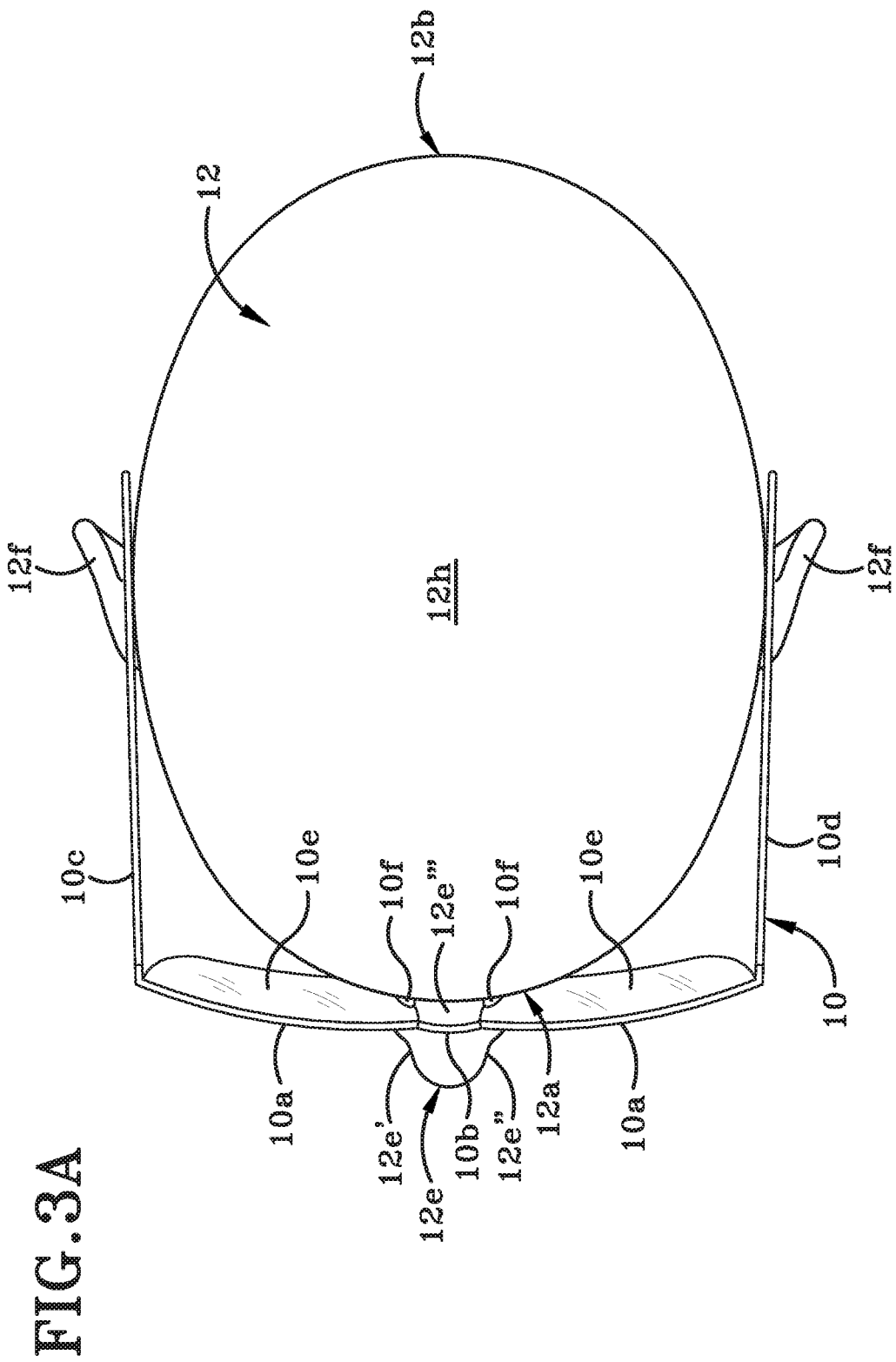

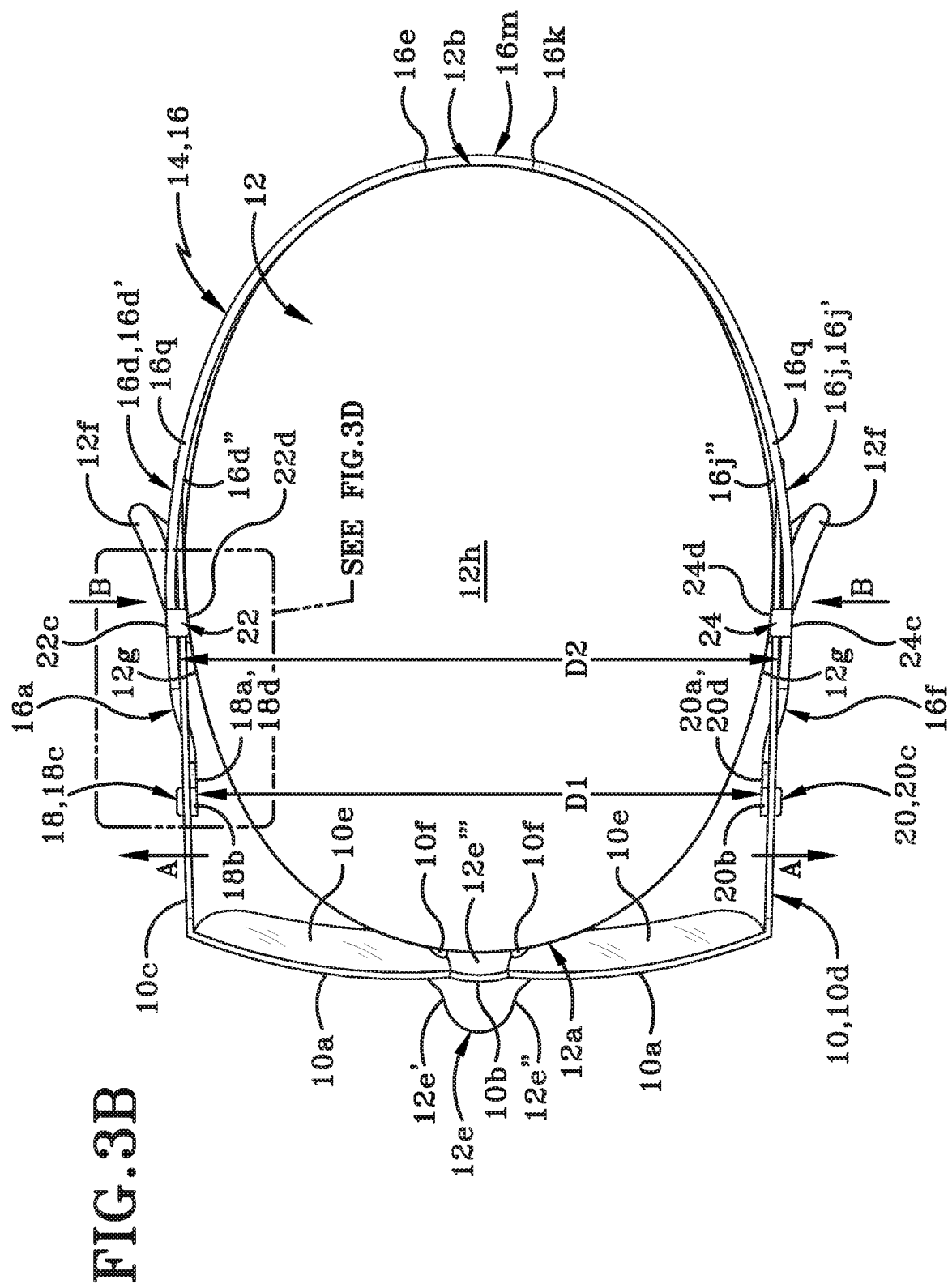

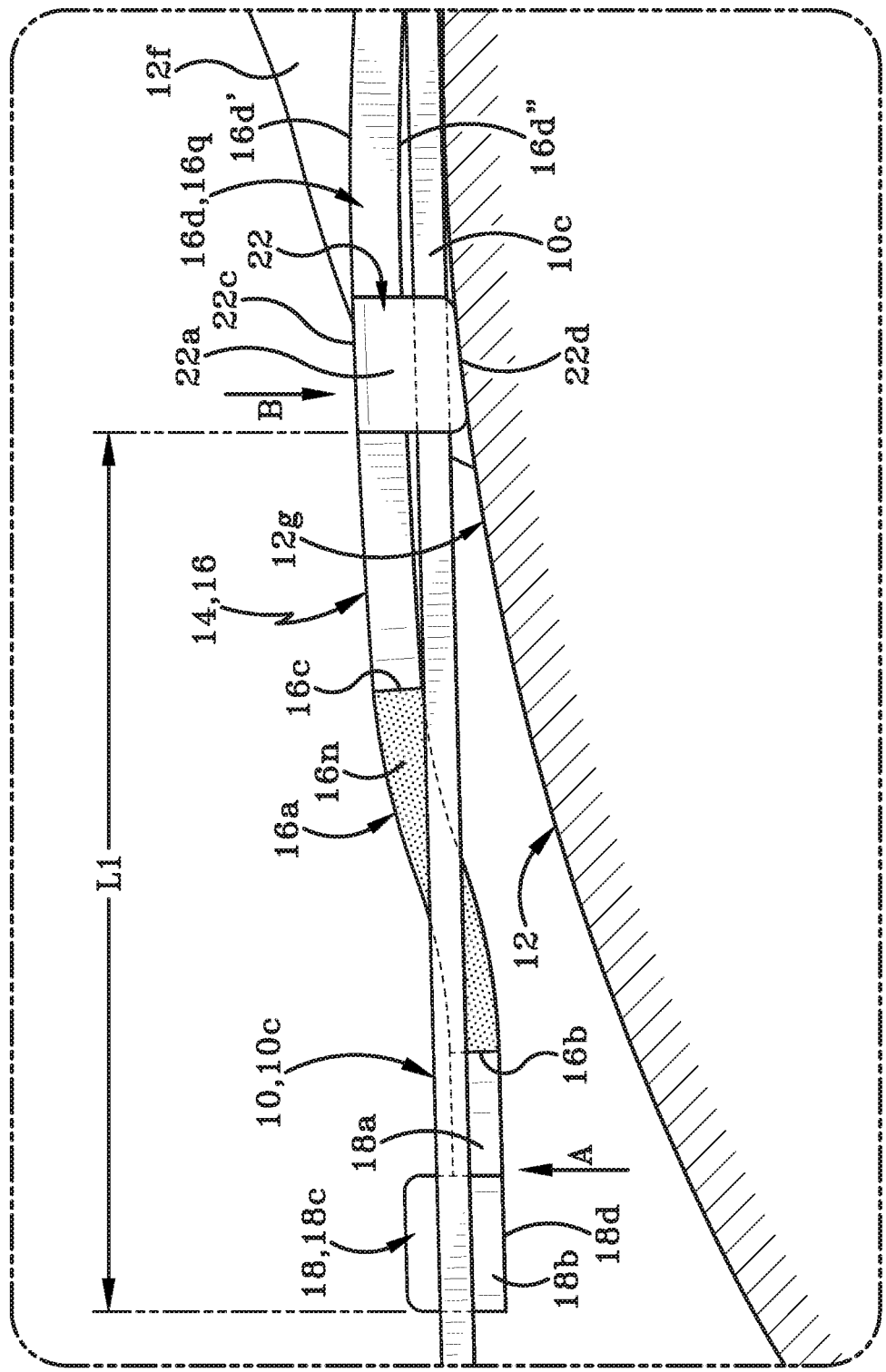

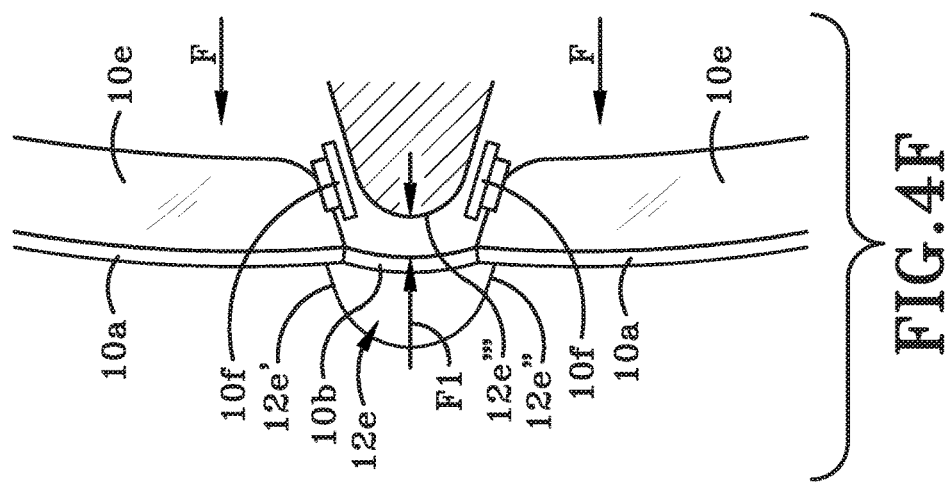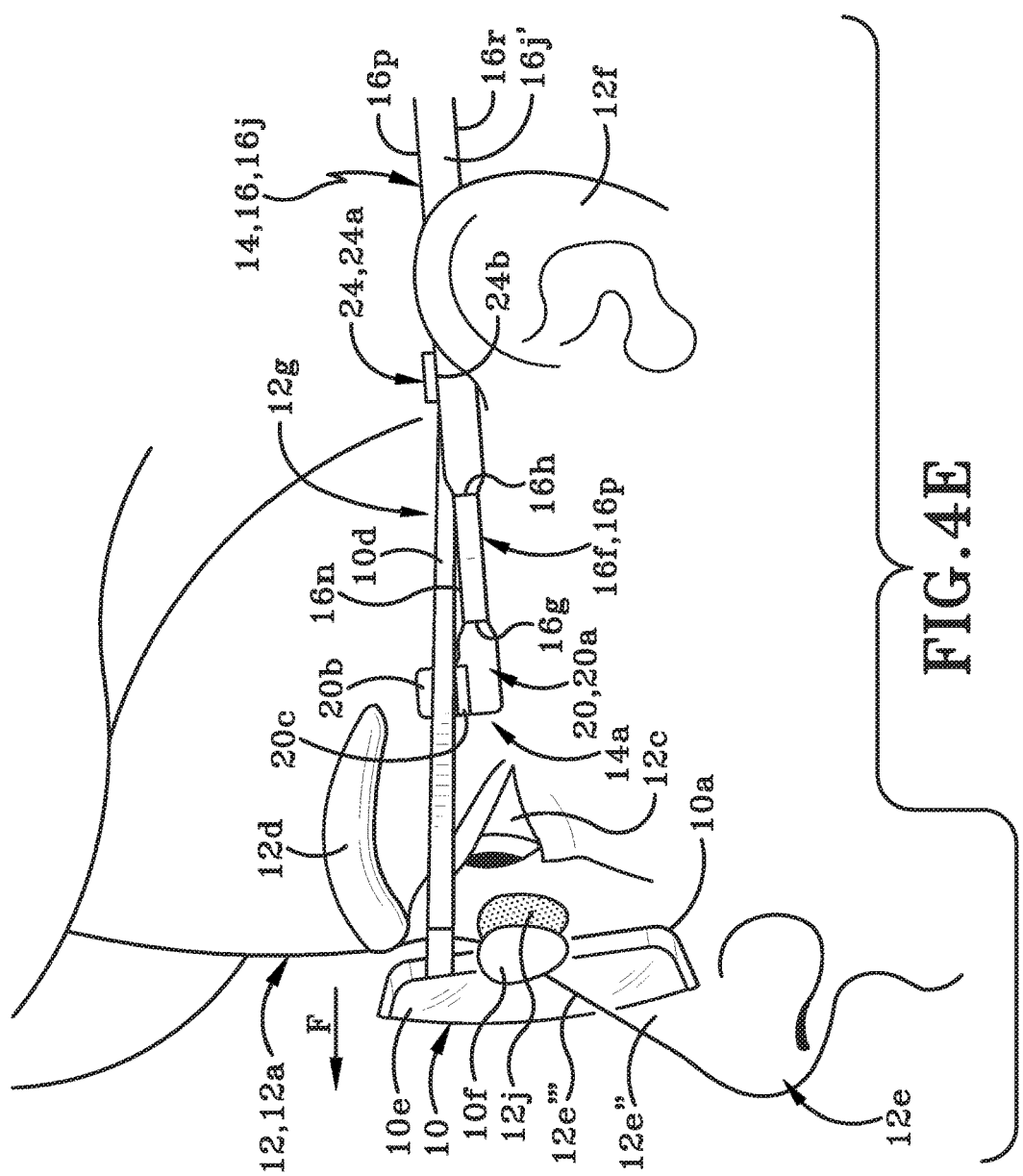

EYEGLASS SUSPENSION DEVICE AND METHOD OF MOVING EYEGLASSES OFF THE NOSE UTILIZING THE SAME

TECHNICAL FIELD

This disclosure relates to optical devices. More particularly, the disclosure is directed to a device that is used with eyeglasses. Specifically, the disclosure relates to a device which holds and supports the eyeglasses in such a way that the eyeglasses are moved off the person's nose and at least some the weight of the eyeglasses is borne by the device.

BACKGROUND

Background Information

Eyeglasses usually include a frame that holds two lenses, one for the user's left eye, and one for the user's right eye. The lenses may be shaped to help correct vision issues including but not limited to myopia (nearsightedness), hyperopia (farsightedness), astigmatism, and presbyopia. Eyeglass frames are made from drawn wire or a lightweight plastic material and include arms which extend along the sides of the user's head and over the top of the ears. The lenses are held by the frame in a position in front of the eyes and a bridge typically extends between the portions of the frame that hold the two lenses. The bridge may include nose pads which contact the sides of the nose. The arms of the frame extend outwardly from the portions of the frame that hold the lenses. The arms extend over the person's ears and may lightly grip the person's head between them. The weight of the eyeglasses is supported partially on the nose via the bridge and nose pads and partially by the ears and head via the arms of the eyeglasses.

The positioning of the bridge and nose pads (if provided) may cause a user to experience a sensation of pressure and weight on the nose. Additionally, the bridge or nose pads may rub against the sides of the nose causing inflammation and pain. This can become an issue for users who suffer from migraines, who have skin cancer, or who have had surgery on the nose, i.e., rhinoplasty. With rhinoplasty or with skin cancer, the tissue of the nose may be swollen or inflamed and so wearing eyeglasses can be extremely painful. In some instances, it may not be possible for the person to have any of the weight of the eyeglasses on their nose and therefore wearing eyeglasses is impossible. These problems are exacerbated if the eyeglasses have to be worn for an extended period of time. In some instances the nose pads may pinch the nose and partially compress the nasal passages, thereby restricting air flow therethrough. This situation may be uncomfortable when the user has a cold and is experiencing a stuffy nose.

Various methods and devices have been suggested in the art to reduce pressure on the nose when wearing eyeglasses. For example, techniques have been suggested which require use of adhesives and provide eyeglasses with abbreviated frames that lack the rearwardly-extending arms which are normally placed over the ears adjacent the temples 12g of the user. One such technique is to apply tape around the eyeglass bridge and attach the tape to the user's forehead and thereby transferring the weight of the eyeglasses onto the user's forehead. This has been objectionable since it is unattractive, the perspiration produced by the skin loosens the tape over time, and the eyeglasses tend to slip down back onto the nose thereby necessitating repetition of the procedure.

U.S. Pat. No. 3,955,885 to Aronsohn et al. discloses a device that is clamped onto a lower peripheral region of and eyeglass frame and includes a cheek pad that rests on the user's cheek. The device transfers the weight of the glasses from the user's nose and on to the cheek. Again, this device is unattractive and may also prove painful to wear if the user has had surgery that leaves parts of the nose and face inflamed.

U.S. Pat. No. 5,123,115 to Moore et al. discloses a cap having a retainer strap that loops around the bridge of eyeglasses and transfers the weight thereof to the cap. The device, again, is unattractive and causes the eyeglasses to be operatively engaged with the cap. If the cap has to be removed from the user's head for any reason, the eyeglasses are simultaneously removed too, leaving the user with compromised vision. This may necessitate the user disengaging their eyeglasses from the supporting cap and placing the bridge and nose pads back onto the nose when the eyeglasses are utilized once again.

SUMMARY

The device and method disclosed herein provides a way to support eyeglasses on user's head in a position wherein the bridge and nose pads (if provided) are moved off of the nose and at least some of the weight of the eyeglasses is transferred to the device from the nose and onto the device. In particular, the device passes around a back and/or top of the user's head and suspends the eyeglasses therefrom in such a way that neither the bridge nor the nose pads of the eyeglasses contact the nose.

A device and method for lifting eyeglasses off a person's nose and transferring at least some of the weight of the eyeglasses onto the device. (The rest of the weight of the eyeglasses may be borne by the arms of the eyeglasses gripping the person's head and/or resting on an upper region of the ears.) The device includes a base which encircles part of the person's head. At least one support is engaged with the base and operatively engages an arm of the eyeglasses. The at least one support may include first and second front supports and first and second temporal supports. Each arm of the eyeglasses rests on an upper surface of one of the first and second front supports and under a lower surface of one of the first and second temporal supports. The arm is counterbalanced between the first and second front supports and first and second temporal supports and is therefore lifted off the person's nose and/or ears. The base may be adjustable in length. The position of the first and second temporal supports on the base may also be adjusted.

In one aspect, an exemplary embodiment of the present disclosure may provide a device for moving eyeglasses off a person's nose, said device comprising a base adapted to encircle at least part of a head of a person; and at least one support extending outwardly from the base and positioned to operatively engage an arm of eyeglasses worn by the person, said at least one support performing one or more of raising the eyeglasses upwardly relative to the person's nose, moving the eyeglasses forwardly away from the person's nose; and raising the eyeglasses upwardly relative to an upper region of the person's ears.

In another aspect, an exemplary embodiment of the present disclosure may provide a method of moving eyeglasses off of a nose of a person, said method comprising placing a base of an eyeglass support device on a persons' head; encircling at least a portion of the person's head with the base; contacting a first side of the person's head with a first temporal support engaged with the base; contacting a second side of the person's head with a second temporal support of the base; passing a first arm of eyeglasses worn by the person under a lower surface of the first temporal support; and moving the eyeglasses one or more of off the person's nose and off the person's ears. The method may further comprise providing a first front support on the base a distance forwardly of the first temporal support; and engaging the first arm of the eyeglasses with the first temporal support. The method may further comprise passing the first arm of the eyeglasses over an upper surface of the first front support; and balancing the first arm between the upper surface of the first front support and the lower surface of the first temporal support.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 3A is a diagrammatic top view of the person's head shown wearing only the pair of eyeglasses;

FIG. 3B is a diagrammatic top view of the person's head showing the eyeglass retention device engaged with the pair of eyeglasses;

FIG. 3D is an enlarged detail view of the area circumscribed within FIG. 3B and showing the eyeglass retention device in a second position engaged with the eyeglasses;

FIG. 4E is a partial left side elevation view of the person's head showing the pair of eyeglasses being pushed forwardly away from the person's nose by the eyeglass retention device;

FIG. 4F is a partial top plan view of the person's head shown in FIG. 3E showing the pair of eyeglasses pushed forwardly away from the person's nose by the eyeglass retention device;

Similar numbers refer to similar parts throughout the drawings.

DETAILED DESCRIPTION

Figure 1:
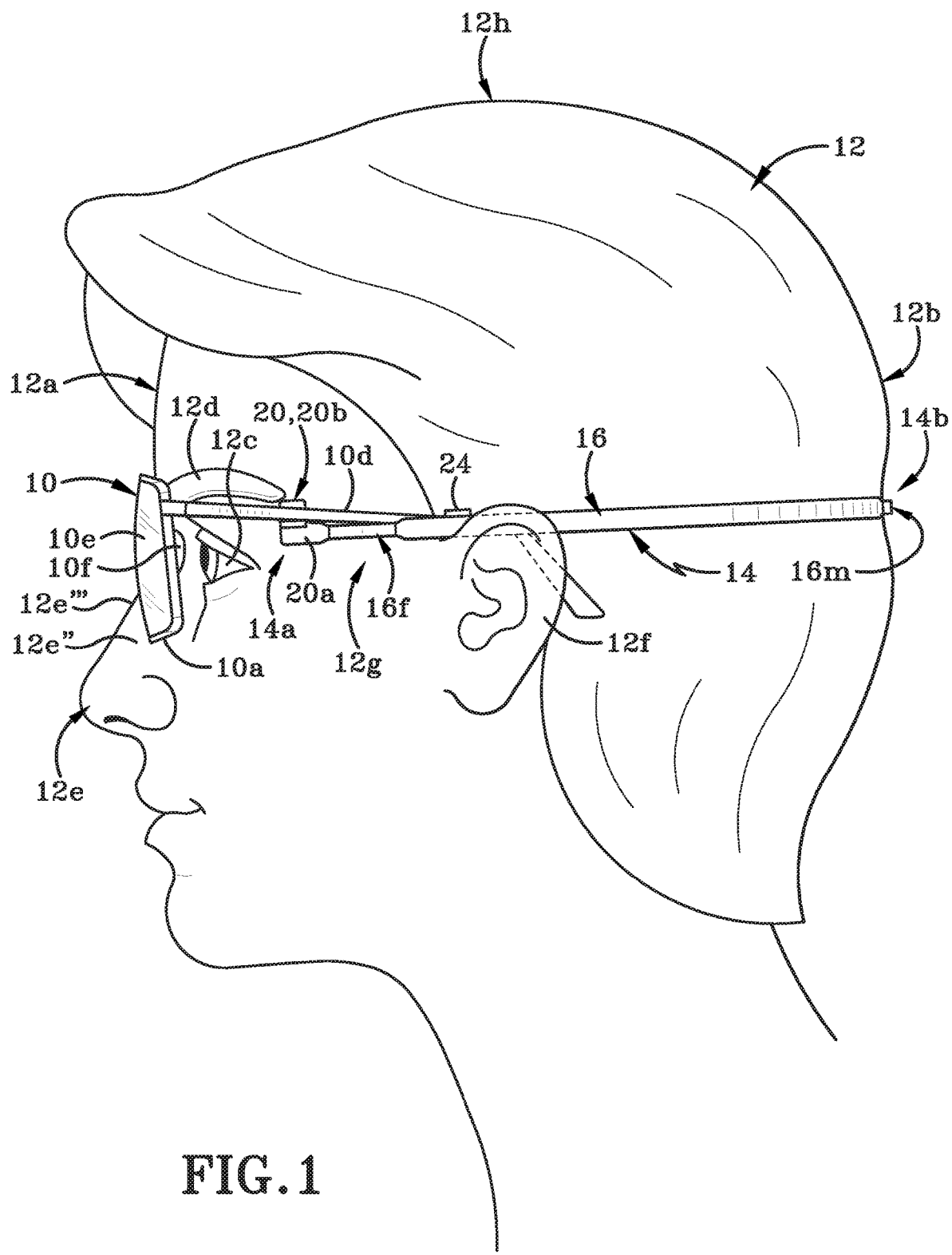
FIG. 1 is a left side elevation view of the head of a person wearing a pair of eyeglasses that are engaged with and supported by a first embodiment of an eyeglass retention device in accordance with an aspect of the present disclosure.
Figure 2:
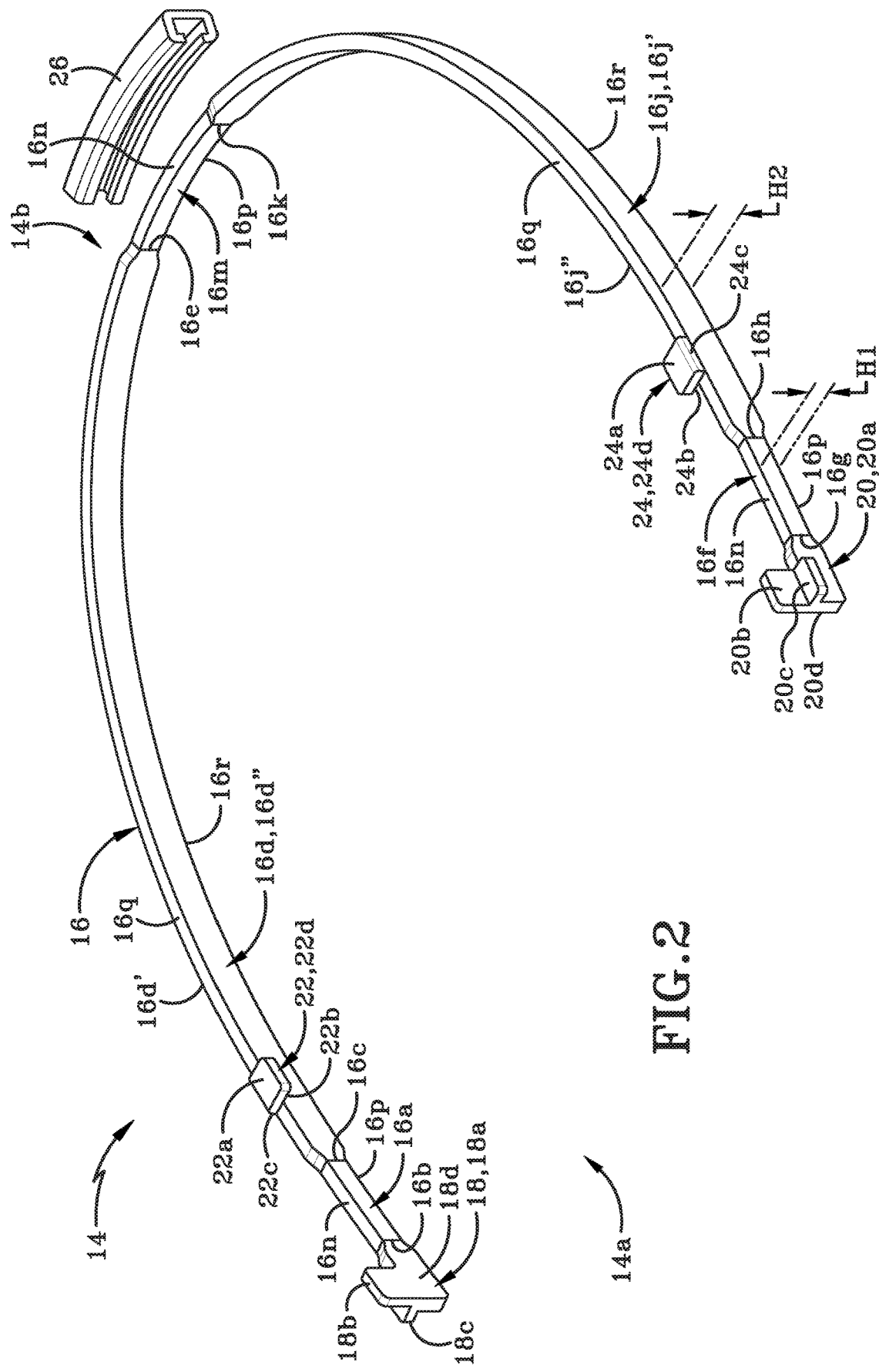
FIG. 2 is a top, front, perspective view of the eyeglass retention device of FIG. 1 shown on its own.

Referring to FIGS. 1-4F, eyeglasses 10 are illustrated which include a frame having two lens regions 10a that are connected to each other via a bridge 10b (FIG. 2). Arms 10c, 10d extend outwardly and rearwardly from the lens regions 10a in generally the same direction when the eyeglasses are worn on a person's head 12. The person's head 12 is diagrammatically illustrated as including a forehead 12a, a back 12b, eyes 12c, eyebrows 12d, a nose 12e, ears 12f, and temples 12g. A top of the person's head is identified by the reference number 12h. When eyeglasses 10 are worn, the arms 10c, 10d thereof are positioned adjacent a respective one of the left side and right side of the person's head 12 and pass over an upper region of an associated one of the left and right ear 12f. At least a portion of each arm 10c, 10d grippingly engages the head 12 rearwardly of the ears 12f or angles downwardly behind the ears 12f as illustrated in FIG. 1. Each lens region 10a of the eyeglasses 10 is configured to securely hold a lens 10e therein. The lenses 10e are positioned forwardly of the person's eyes 12c when the eyeglasses 10 are worn. A pair of nose pads 10f (FIGS. 4A-4D) are provided on the lens regions 10a or on the bridge 10b of the eyeglasses 10. As is best seen in FIG. 4C, nose pads 10f are configured and positioned to contact the side surfaces of the person's nose 12e. The weight of the eyeglasses 10 is therefore largely borne by the person's nose 12e and to a lesser extent by the person's ears 12f and head 12 via the arms 10c, 10d.

Referring now to FIG. 2, there is shown a first embodiment of an eyeglass retention and suspension device in accordance with the present disclosure, generally indicated by the reference number 14. The eyeglass retention and suspension device 14 will be referred to hereinafter by the term "device" or "apparatus" 14. Device 14 has a front, generally indicated in FIG. 2 by the reference number 14a and a rear, generally indicated by the reference number 14b. Device 14 is contemplated to be worn on the user's head such that the front 14a is located immediately rearwardly of the person's eyebrows 12d, i.e., on the person's temples 12g, and the rear 14b is located proximate the back of the user's head 12. Device 14 is configured to be selectively engaged with eyeglasses 10. In particular, the eyeglasses 10 are engaged largely by the front 14a of device 14. Device 14 is configured to lift the eyeglasses 10 off the nose 12e in such a way that at least some of weight of the eyeglasses 10 is borne by the device 14 instead of by the person's nose 12e. The rest of the device 14, particularly the part located rearwardly of the front 14a and including the rear 14b, is used to counterbalance the weight of the eyeglasses 10 and to aid in keeping that weight of the eyeglasses 10 off the nose 12e.

The device 14 and its method of use will described in greater detail hereafter. Referring still to FIG. 2, device 14 comprises a base 16 includes a generally U-shaped base 16, a first front support 18, a second front support 20, a first temporal support 22, and a second temporal support 24.

Base 16 is generally U-shaped when viewed from above as best seen in FIG. 2. Base 16 may be a unitary, monolithic component that is shaped to include several different regions or the base 16 may be fabricated from two or more different materials. The different regions of base 16 include a right front region 16a having a first end 16b and a second end 16c. First front support 18 is operatively engaged with first end 16b and extends forwardly therefrom. A right arm region 16d extends from second end 16c to a rear end 16e. Base further includes a left front region 16f having a first end 16g and a second end 16h. Second front support 20 is operatively engaged with first end 16g and extends forwardly therefrom. A left arm region 16j extends from second end 16h to a rear end 16k. A rear region 16m extends between rear end 16e and rear end 16k. Each of the right arm region 16d and left arm region 16j is curved to be complementary to the contours of the person's head 12.

The entire lengths of right arm region 16d and left arm region 16j are located in the same plane. In other words, the entire base 16 is located generally in one plane. In accordance with an aspect of the present disclosure, base 16 is symmetrical and first end 16b is laterally aligned with first end 16g, second end 16c is laterally aligned with second end 16h, and rear end 16e is laterally aligned with rear end 16k. This is best seen in FIG. 2. The figure also shows that first front support 18 and second front support 20 are laterally aligned with each other, as are first temporal support 22 and second temporal support 24.

FIGS. 2, 3B-3D show that right front region 16a and left front region 16f are structurally substantially identical to each other and are arranged as mirror images of each other. Each of the right front region 16a and left front region 16f has an upper surface 16n and a lower surface 16p. The upper surfaces 16n are vertically aligned with each other and the lower surfaces 16p are vertically aligned with each other. The distance between upper surface 16n and lower surface 16p defines a first height "H1". The right front region 16a and left front region 16f extend forwardly from the second ends 16c, 16h, but also angle inwardly toward each other to a certain degree. As a result, a first distance "D1" between first ends 16b and 16g is smaller than the second distance "D2" between second ends 16c and 16h. Since first and second front supports 18, 20 are engaged with base 16 forwardly of first ends 16b, 16g and first and second temporal supports 22, 24 are engaged with base 16 rearwardly of second ends 16c, 16h, first and second front supports 18, 20 are located closer to each other than are first and second temporal supports 22, 24.

FIGS. 2, 3B-3D also show that right arm region 16d and left arm region 16j are substantially identical in structure and are arranged as mirror images of each other in device 14. Each of the right arm region 16d and left arm region 16j has an upper surface 16q and a lower surface 16r. The upper surfaces 16q are vertically aligned with each other and the lower surfaces 16r are vertically aligned with each other. The distance between upper surface 16q and lower surface 16r defines a second height "H2". The second height "H2" is greater than the first height "H1". The right arm region 16d and left arm region 16j taper downwardly in height proximate the respective second ends 16c, 16h, and rear ends 16e, 16k.

The rear region 16m extends between rear end 16e and rear end 16k and has an upper surface 16n and a lower surface 16p that are vertically aligned with the upper surfaces 16n and lower surfaces 16p of the right front region 16a and left front region 16f. In other words, the height of rear region 16m is the height "H1".

Figure 3C:
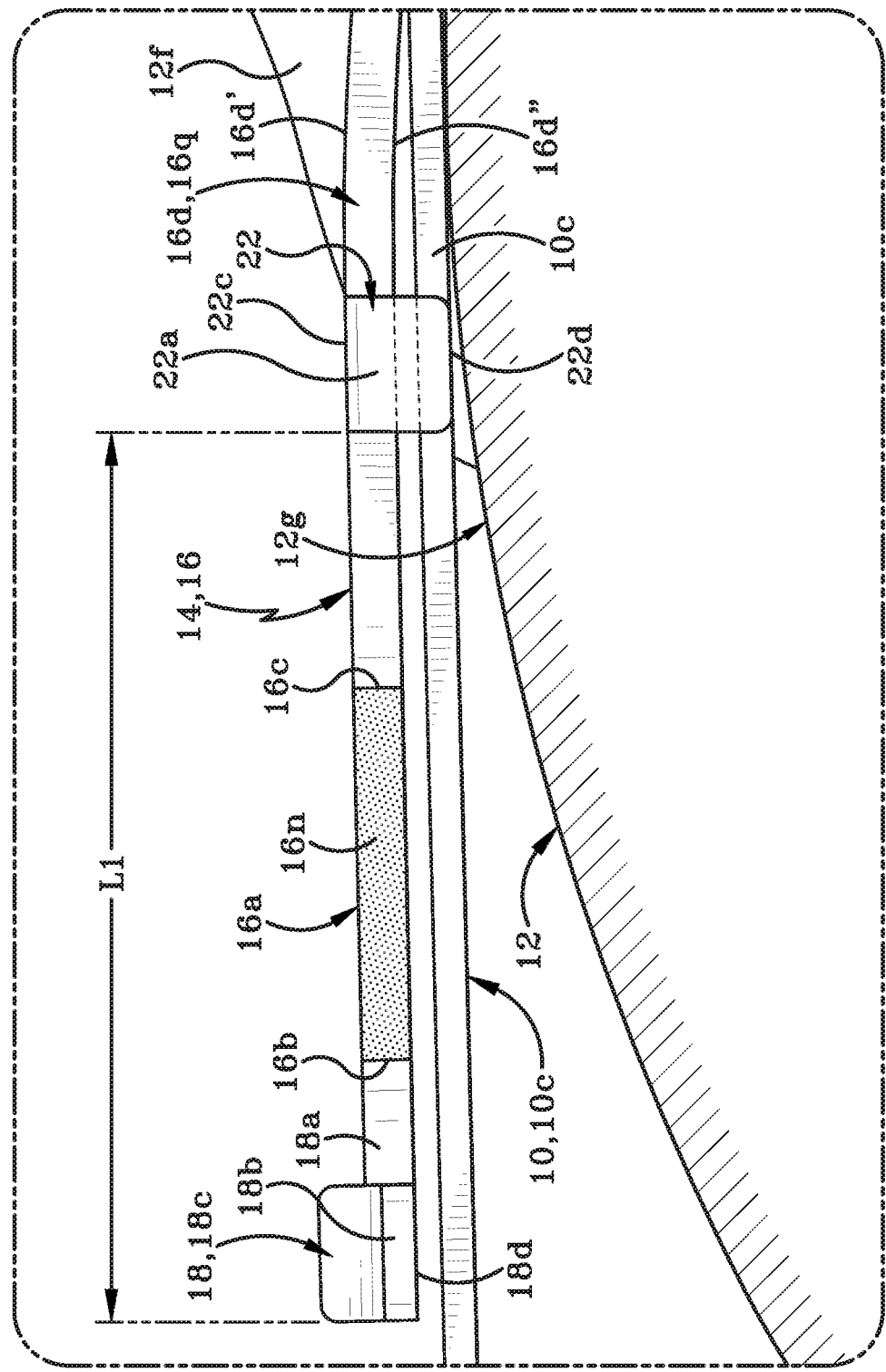
FIG. 3C is an enlarged partial top view of the person's head where the eyeglass retention device is in a first position where the device is not yet engaged with the eyeglasses.

Base 16 may be substantially continuous from first end 16b to first end 16g. The U-shaped base 16 may be fabricated from any material that provides both strength and flexibility. Right front region 16a and left front region 16f, in particular, may be fabricated from a material that is selectively bendable. FIG. 3C shows an enlargement of the right front region 16a of base 16 in a first position where right front region 16d extends forwardly from a forward section of right arm region 16d. Right front region 16a is generally in alignment with the forward section of right arm region 16d. Although not illustrated in this figure, it will be understood that left front region 16f may similarly be in a first position where the left front region 16f extends forwardly from a forward section of left arm region 16j and is generally in alignment therewith. When device 14 is to be engaged with eyeglasses 10, right front region 16a and left from region 16f are bent inwardly order to engage arms 10c, 10d with first front support 18 and second front support 20, respectively. FIG. 3B shows the right front region 16a and the left front region 16f bent to engage arms 10c, 10d of eyeglasses 10. FIG. 3D shows an enlargement of the highlighted region of FIG. 3B. The right front region 16d is shown bent inwardly and interlockingly engaging arm 10c. Left front region 16e will similarly be bent to interlock with arm 10d. When the right front region 16a and left front region 16f are not bent, then the device 14 is in the first position, i.e., an unengaged position. When right front region 16a and left front region 16f are bent inwardly to interlock with arms 10c, 10d, respectively, then the device 14 is in the second position, i.e., an engaged position.

As is evident when comparing FIGS. 3C and 3D, when device 14 is in the second position where it is engaged with the pair of eyeglasses 10, the right front region 16a, and left front region 16b bend inwardly towards the person's head 12. This bending of the right and left front regions 16a, 16f helps to keep eyeglasses 10 engaged with device 14 because of a lateral, outwardly pushing force "A" (FIG. 3B) resulting as a reaction to the bending. This will be further discussed later explained herein. Additionally, the right front region 16a may be bent so that it angles slightly downwardly, forwardly, and inwardly from right arm region 16d. Left front region 16f may similarly angle slightly downwardly, forwardly, and inwardly from left arm region 16j. Rear region 16m may also be bent slightly to help ensure base 16 grippingly engages the person's head 12 to a desired degree.

Right arm region 16d and left arm region 16j are fabricated from a rigid, non-bendable material. In another example, the entire device 14 may be fabricated by injection-molding plastic. In yet another example, the base 16 may be fabricated from a U-shaped piece of metal that has metal and/or plastic components engaged therewith. For example, plastic sleeves may be applied around portions of the metal to form the right arm region 16d and left arm region 16j. Utilizing wider plastic sleeves for the right arm region 16d and left arm region 16j may make the base 16 more comfortable to wear. The plastic sleeves may also provide a better grip on the person's head 12 than just a metal U-shaped component on its own. The first and second supports 18, 20 and/or first and second temporal supports may be fabricated from metal or from plastic or from any other suitable material and then be separately engaged with base 16.

Referring to FIGS. 2, 3B-3D, first front support 18 and second front support 20 will be described in greater detail. First and second front supports are substantially identical in structure and function but are engaged with base 16 in orientations that are mirror images of each other. First and second front supports 18, 20 are engaged with base 16 in such a way that the supports 18, 20 are laterally aligned with each other.

For clarity of illustration and description, only second front support 20 will be described in greater detail. Referring primarily to FIG. 2 second front support 20 is L-shaped when viewed from the left side or the right side. Second front support 20 comprises a first leg 20a, a second leg 20b, and an arm 20c. First leg 20a and second leg 20b are oriented generally at right angles to each other. First leg 20a is operatively engaged with first end 16g and extends forwardly therefrom in such a way that an inner surface 20d (FIGS. 3B-3D) of first leg 20a and second leg 20c is substantially flush with an inner surface (not numbered) of left front region 16f. Inner surface 20d is that surface of second front support 20 that will be closest to the person's head 12 when device 14 is worn. First leg 20a is generally aligned with left front region 16f and extends forwardly therefrom. Second leg 20b extends vertically upwardly from first leg 20a and for a distance outwardly beyond upper surfaces 16n and 16q of base 16.

Arm 20c extends horizontally outwardly from an outer surface (not numbered) of one or both of first leg 20a and second leg 20b. The outer surface is opposite inner surface 20d and is that surface which is remote from the person's head 12 when the device 14 is worn. Arm 20c may be located on second front support 20 such that a lower surface of arm 20c is generally horizontally aligned with upper surface 16q of left arm region 16j. It will be understood that arm 20c may be located vertically above upper surface 16q or vertically below upper surface 16q in other examples. Arm 20c is oriented at an angle relative to the outer surface of first leg 20a and second leg 20b and projects for a distance outwardly beyond an outer surface of left front region 16f. The angle of arm 20c is one that is sufficient to permit the arm 10d of eyeglasses 10 to rest thereon and to be supported thereby. In one example, arm 20c is oriented at right angles to the outer surface of first leg 20a and second leg 20b.

It should be noted that first front support 18 includes a first leg 18a (FIG. 3D) that is substantially identical to first leg 20a, a second leg 18b that is substantially identical to second leg 20b, and an arm 18c that is substantially identical to arm 20c. The first leg 18a and second leg 18b of first front support 18 present a flat inner surface 18d that is positioned closest to the person's head 12 when device 14 is worn and an outer surface (not numbered) that is remote therefrom. The arm 18c therefore extends outwardly from the outer surface of first leg 18a and second leg 18b and in a direction extending away from the person's head 12. The arm 18c is at an angle to first leg 18a and second leg 18b that is suitable for supporting arm 10c of eyeglasses thereon. Similarly, the arm 20c extends outwardly from the outer surface of first leg 20a and second leg 20b and in a direction extending away from the person's head 12 (and in the opposite direction to arm 18c). The arm 20c is at an angle to first leg 20a and second leg 20b that is suitable for supporting arm 10d of eyeglasses 10 thereon Referring still to FIG. 2, first and second temporal supports 22, 24 are substantially identical to each other and are engaged with right arm region 16d and left arm region 16j, respectively in such a way that the first and second temporal supports 22, 24 are laterally aligned with each other on base 16. Each of the first and second temporal supports 22, 24 is located rearwardly from the respective second end 16c, 16h on base 16. FIGS. 3C and 3D show that first and second temporal supports are located a distance "L1" rearwardly from a leading end the respective first front support 18 and second front support 20.

Each of the first and second temporal support 22, 24 comprises a flat plate having an upper surface 22a, 24a and a lower surface 22b, 24b, respectively. Each of the first and second temporal supports 22, 24 also has an exterior surface 22c, 24c and an interior surface 22d, 24d, respectively. Lower surface 22b, 24b is fixedly secured to or integrally formed with the upper surface 16q of the respective right arm region 16d or left arm region 16j of base 16. As best seen in FIGS. 2 and 3C, exterior surface 22c of first temporal support 22 is generally aligned with (or flush with) the outer surface 16d' of right arm region 16d. First temporal support 22 extends inwardly and beyond the inner surface 16d'' of right arm region 16d such that the interior surface 22d of first temporal support 22 is located a distance inwardly from the inner surface 16d'' of right arm region 16d. A similar configuration exists with second temporal support 24 and left arm region 16j. In this configuration, the exterior surface 24c of second temporal support 24 is generally aligned with (or flush with) the outer surface 16j' of left arm region 16j. The second temporal support 24 extends inwardly beyond inner surface 16j'' such that the interior surface 24d of second temporal support 24 is located a distance inwardly from the inner surface 16j'' of left arm region 16j.

As illustrated in FIG. 1, when this first embodiment of device 14 is worn by a user 12, the first and second front supports 18, 20 are located generally adjacent a rearmost region of the person's eyebrows 12d and the first and second temporal supports 22, 24 are located slightly forwardly of the person's ears 12f. (The term "slightly" as used herein is meant to depict a relatively short distance.) As illustrated in FIG. 3D, the interior surface 22d of the plate of first temporal support 22 is angled such that the plate is wider toward the front of device 14 and narrower toward the rear of device 14. This slight angle of interior surface 22d helps first temporal support 22 to more comfortably contact the person's head 12. Similarly, the interior surface 24d of second temporal support 24 is angled such that the front of the plate of second temporal support 24 is wider that a rear region thereof and the interior surface 24d will rest comfortably against the user's head. The angle on the interior surface 24d is a mirror image of the angle on the interior surface 22d. It will be understood that in other examples, the interior surfaces 22d, 24d may not be angled and the plates of first and second temporal supports 22, 24 will be square or rectangular in configuration.

A weight 26 is selectively operatively engaged with rear region 16m. If the weight is engaged with base 16, weight 26 is utilized to counterbalance the front 14a of device 14 and to help device 14 support part of the weight of eyeglasses 10 thereon. The counterbalancing effect of weight 26 helps to prevent the eyeglasses 10 dropping downwardly back onto the person's nose 12e.

In another example, instead of providing a detachable weight 26, rear region 16m may be fabricated from a material that is heavier than the rest base 16. The heavier rear region 16m will then be better able to counterbalance the weight of eyeglasses 10 on device 14. It will be understood that in other examples, weight 26 may be omitted or the rear region 16m may be fabricated from materials of similar mass to other parts of base 16 instead of being heavier.

Referring to FIGS. 1 to 4F, device 14 is used in the following manner. FIGS. 3A, 4A, and 4C shows eyeglasses 10 worn in a conventional fashion on the user's head. Nose pads 10f (FIG. 4C) are in direct abutting contact with the sides 12e' and 12e'' of the person's nose 12e. Additionally, bridge 10b is located a first height "E1" off the bridge 12e'''' of the person's nose 12e. The arms 10c, 10d of eyeglasses 10 extend along the sides of the person's head 12 and over the upper region of the ears 12f.

When it is desired to lift bridge 10b and nose pads 10f off the nose 12e, the person will place device 14 on their head 12. In particular, rear 14b of device 14 is positioned adjacent the back 12b of the head 12 and the right and left arm regions 16d, 16j extend forwardly and generally horizontally on head 12 and towards eyes 12c The device 14 is further positioned so that the front ends of right and left arm regions 16d, 16j will pass over the upper region of the person's ears 12f. Because of the spring-like nature of the material utilized to form base 16, along with the U-shape thereof, the base 16 will grippingly engage the back 12b and sides (not numbered) of the person's head 12 and be retained in place by friction and by the spring action of the base 16. The inner surfaces 22d, 24d of first and second temporal supports 22, 24 will contact the sides of the person's head 12 in a location that is toward a rear portion of the temples 12g and in front of the ears 12f. As can be seen in FIG. 2, when device 14 is in position on the person's head 12, the right front region 16a, and left front region 16f angle slightly inwardly toward the temples 12g and then extend forwardly therefrom.

When eyeglasses 10 and device 14 are initially placed on head 12, the right front region 16a and left front region 16f, and therefore the device 14, are in a first position (FIG. 3C). In this first position, the right front region 16a and left front region 16f extend generally forwardly in alignment with at least a portion of the right arm region 16d and left arm region 16j, respectively. When eyeglasses 10 are engaged with device 14, the right front region 16a and left front region 16f are bent inwardly (FIGS. 3B, 3D) such that the arms 10c, 10b of eyeglasses 10 will rest on the horizontal arm 18c, 20c of the first and second front supports 18, 20. The arms 10c, 10d then pass under first and second temporal supports 22, 24. The first and second front supports 18, 20 are located on the leading end of each of the bendable right and left front regions 16a, 16f and when the device 14 is in the second position, the first and second front supports 18, 20 are located a distance laterally inwardly relative to the first and second temporal supports 22, 24. As a result, first and second front supports 18, 20 apply an outward force "A" (FIGS. 3B and 3D) on arms 10c, 10d; i.e., the vertically-extending second legs 18b, 20b contact the side of the associated arm 10c, 10d and push laterally outwardly thereon. The inner surface 16d'', 16j'' of base 16 adjacent first and second temporal supports 22, 24 press laterally inwardly on the side of the associated arm 10c, 10d and apply an inward pressing force "B". The arms 10c, 10d are thereby clampingly engaged with base 16 and are retained in interlocking engagement therewith.

Figure 4A:
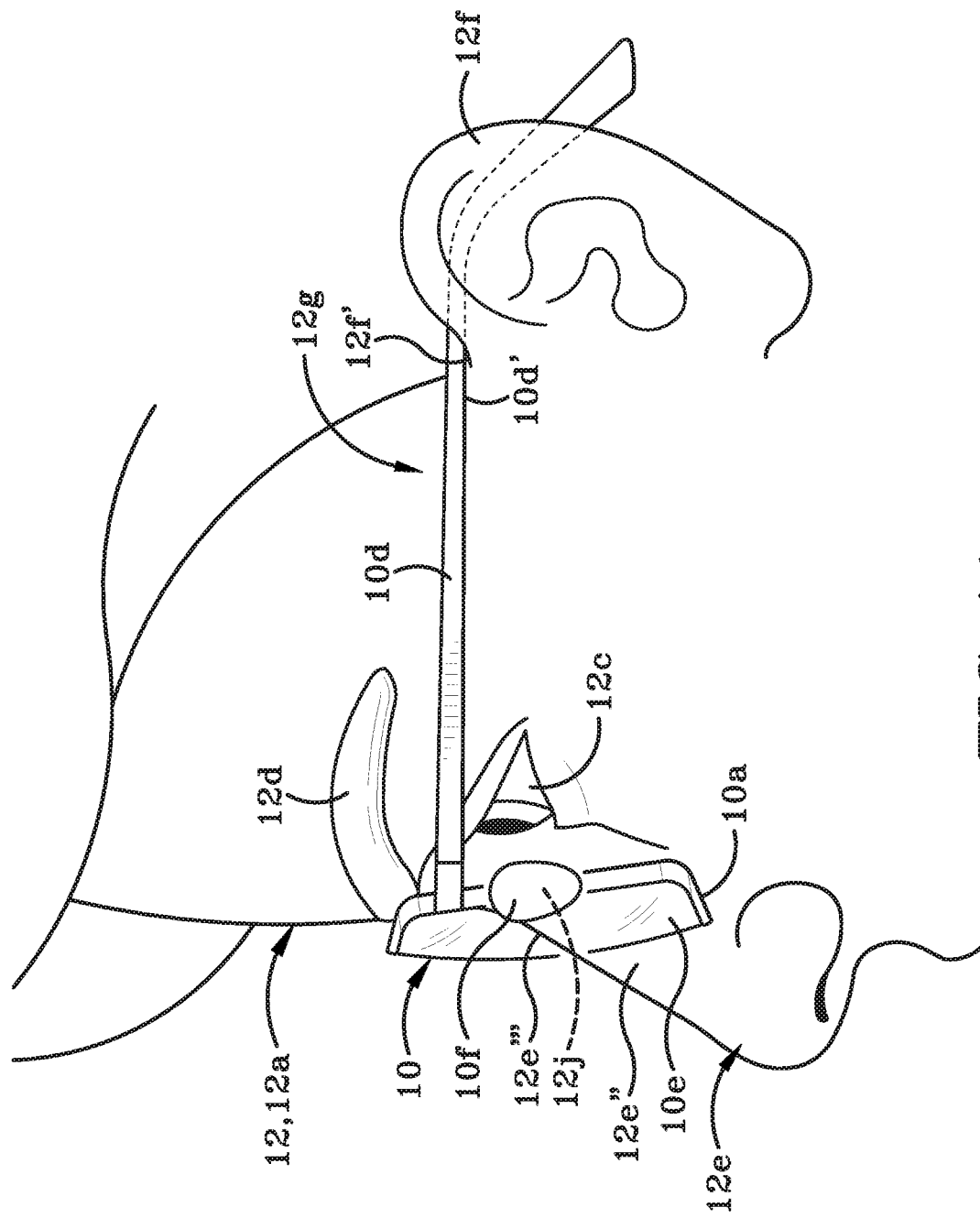
FIG. 4A is a partial left side elevation view of the person's head shown wearing only the pair of eyeglasses.
Figure 4B:
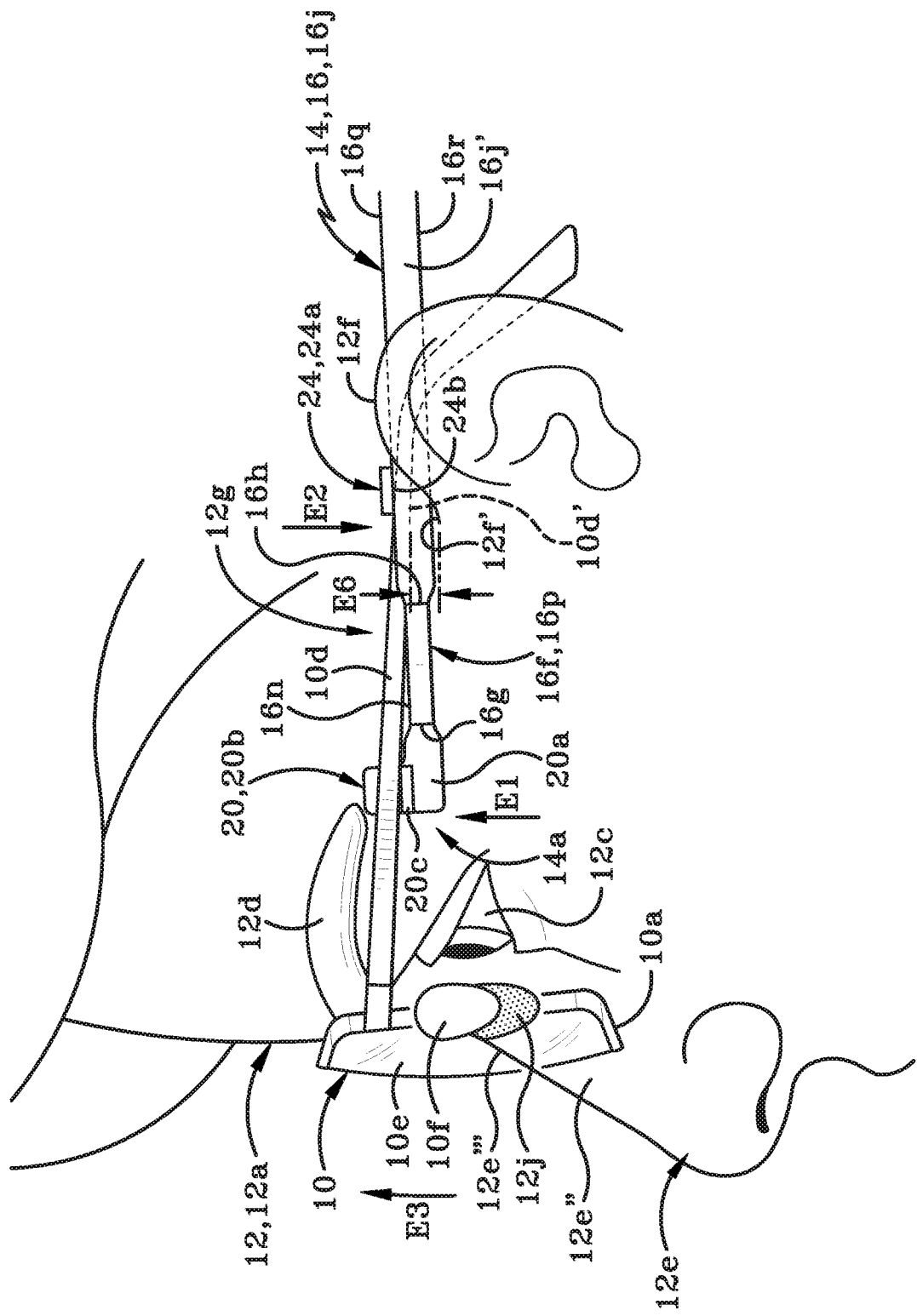
FIG. 4B is a partial left side elevation view of the person's head shown wearing the pair of eyeglasses that are retained and suspended by the eyeglass retention device.
Figure 4D:
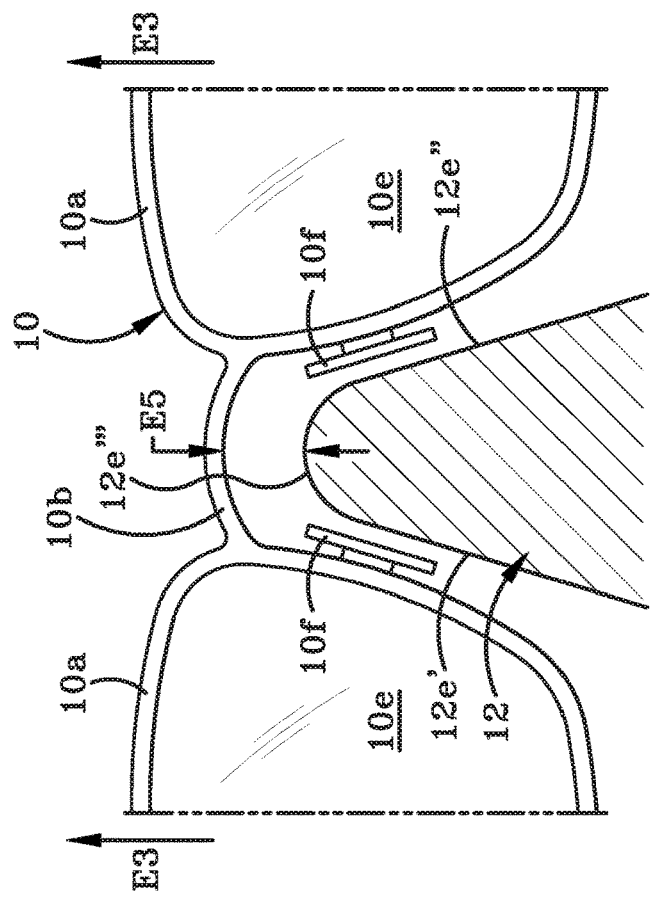
FIG. 4D is a partial front elevation view of FIG. 4B showing the bridge and nose pads lifted off the person's nose because the pair of eyeglasses are retained and suspended by the eyeglass retention device.
Figure 4C:
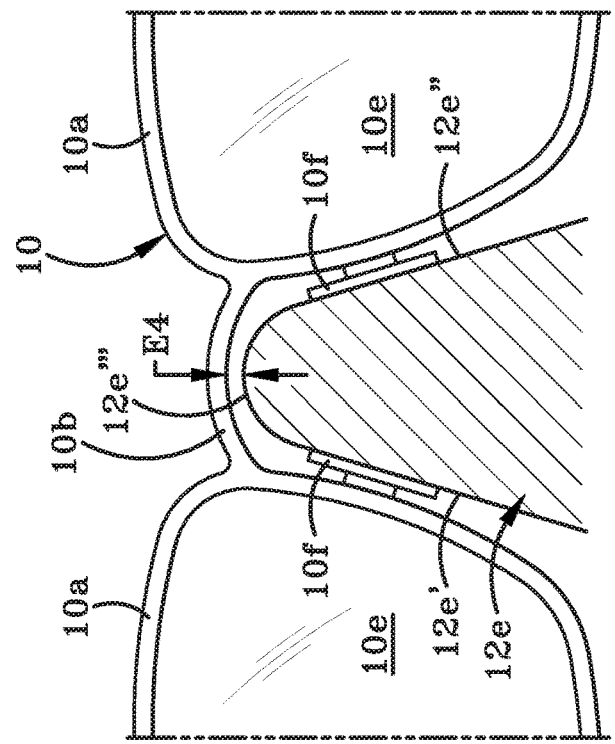
FIG. 4C is a partial front elevation view of FIG. 4A showing the position of the bridge and nose pads of the pair of eyeglasses relative to the person's nose.

As indicated earlier herein, arms 10c, 10d pass over an upper surface of the arms 18c, 20c of first and second front supports 18, 20 and pass under a lower surface 22b, 24b of the associated first and second temporal supports 22, 24. First and second front supports 18, 20 cause an upward lifting force "E1" (FIG. 4B) on the associated arms 10c, 10d. This is because the upper surface of arms 18c, 20c push upwardly on the underside of the associated arm 10c, 10d. First and second temporal supports 22, 24 cause a downward pressing force "E2" on the associated arms 10c, 10d because the lower surfaces 22b, 24b push downwardly on the upper surface of the associated arm 10c, 10d. Because a front region of each arm 10c, 10d passes over the associated horizontal arm 18c, 20c and a rear region of each arm 10c, 10d passes under the associated horizontal plate of first and second temporal supports 22, 24, each arm 10c, 10d, and therefore the frame and lenses 10e, are tilted slightly upwardly about a fulcrum. (The fulcrum is effectively the horizontal arm 18c for eyeglass arm 10c and is the horizontal arm 20c for eyeglass arm 10d.) The upward lifting or tilting of eyeglasses 10 off the person's nose 12e is shown in FIG. 4B by the arrow "E3". In particular, the upward lifting or tilting of eyeglasses 10 in the direction "E3" causes bridge 10b and nose pads 10f to be moved upwardly off the nose 12e. FIG. 4C shows that prior to device 14 being engaged with the eyeglasses 10, the nose pads 10f contact the sides 12e' and 12e" of the person's nose 12e and the bridge 10b is located a distance "E4" off the bridge 12'" of the nose 12e. After eyeglasses 10 are engaged with device 14 and the upwardly lifting and tilting in the direction "E3" has occurred, the nose pads 12f no longer contact the sides 12e' and 12e" of the nose 12e and the bridge 10b of eyeglasses 10 is located a distance "E5" above the bridge 12e"" of the nose 12e. The upward movement "E3" not only lifts the eyeglasses 10 off the person's nose 12 but also transfers the weight of the eyeglasses 10 that typically would be borne by the person's nose 12, onto the device 14.

It should be noted that at the same time that the eyeglasses 10 are lifted by device 14 off nose 12e, the eyeglasses 10 may also be lifted by the device 14 a short distance above an upper region of the user's ears 12f. FIG. 4A is a left side elevation view showing the person wearing a pair of eyeglasses 10. The figures shows the bottom surface 10d' of arm 10d of the eyeglasses 10 resting on a top region 12f' of person's ears 12f. FIG. 4B shows the eyeglasses 10 engaged with the device 14. The figure further shows that the bottom surface 10d' of arm 10d of eyeglasses 10 has been lifted a distance vertically above the top region 12f' of the user's ears 12f. The distance the bottom surface 10d' has been lifted by device 14 is indicated by the reference number "E6" in FIG. 4B. It will be understood that arm 10c of eyeglasses 10 will similarly be lifted vertically off the top of the person's other ear. In this instance, more of the weight of eyeglasses 10 will be transferred from the person's ears 12f to device 14. The degree to which the eyeglasses 10 are lifted off the nose 12e and ears 12f may also affected by the specific positioning of base 16 on the person's head 12.

In addition to or instead of lifting the eyeglasses 10 in the direction "E3" away from the nose 12e, engagement of device 14 with eyeglasses 10 may additionally or alternatively move eyeglasses 10 forwardly in the direction indicated by arrow "F" in FIGS. 4E and 4F. This forward movement lifts nose pads 10f off the region 12j of nose 12e and therefore transfers the weight of the eyeglasses 10 that typically would be borne by the nose 12e onto the device 14. Again, it should be noted that at the same time that the eyeglasses 10 are lifted by device 14 off nose 12e, the eyeglasses 10 may also be slightly lifted by the device 14 a distance above an upper region of the user's ears 12f. It should be noted that it is also possible that horizontal arms 18c, 20c may be utilized to adjust device 14 when engaged with eyeglasses 10.

Figure 5:
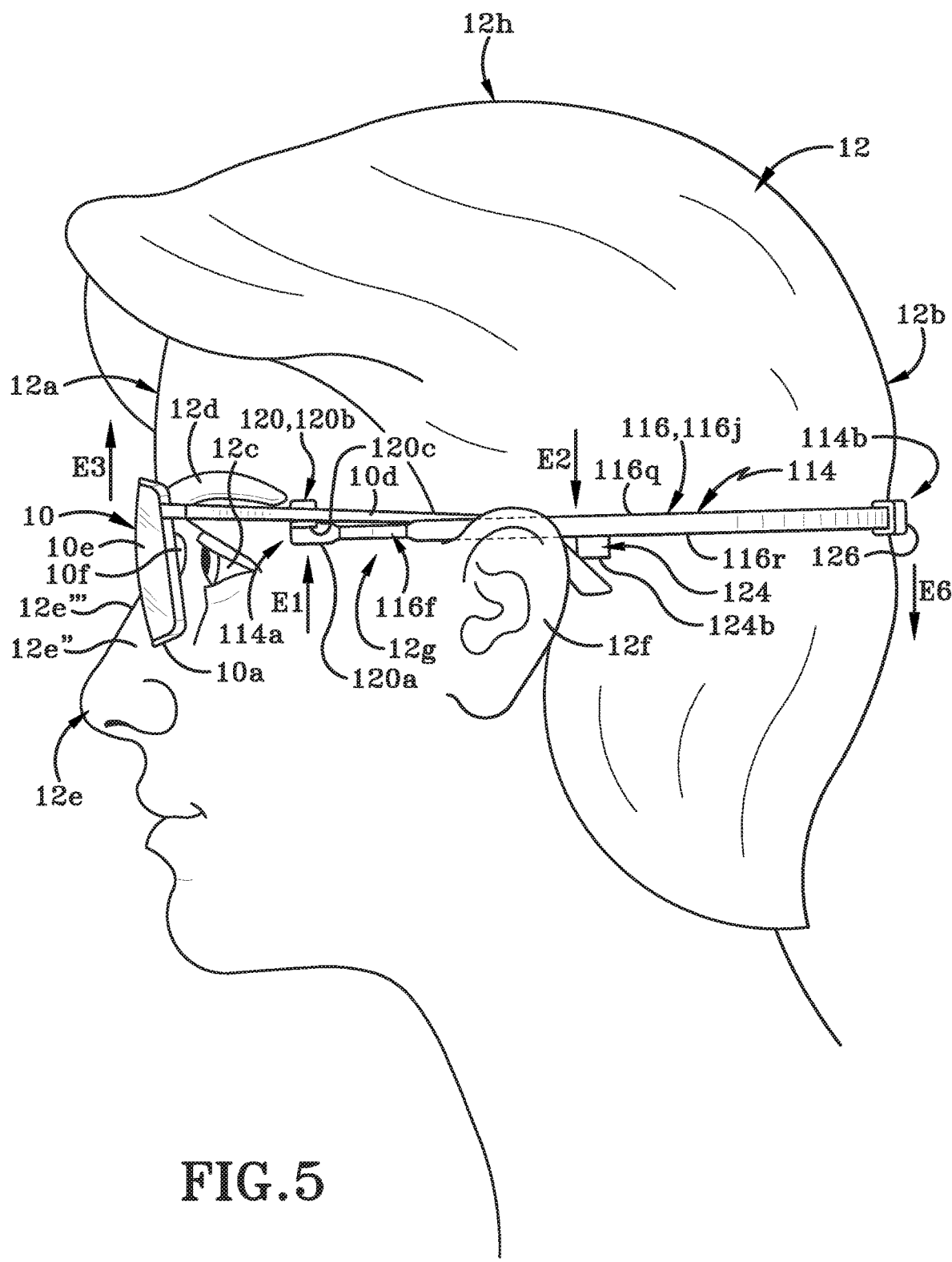
FIG. 5 is a left side elevation view of a second embodiment of an eyeglass retention device in accordance with an aspect of the present disclosure shown worn on the person's head.
Figure 5A:
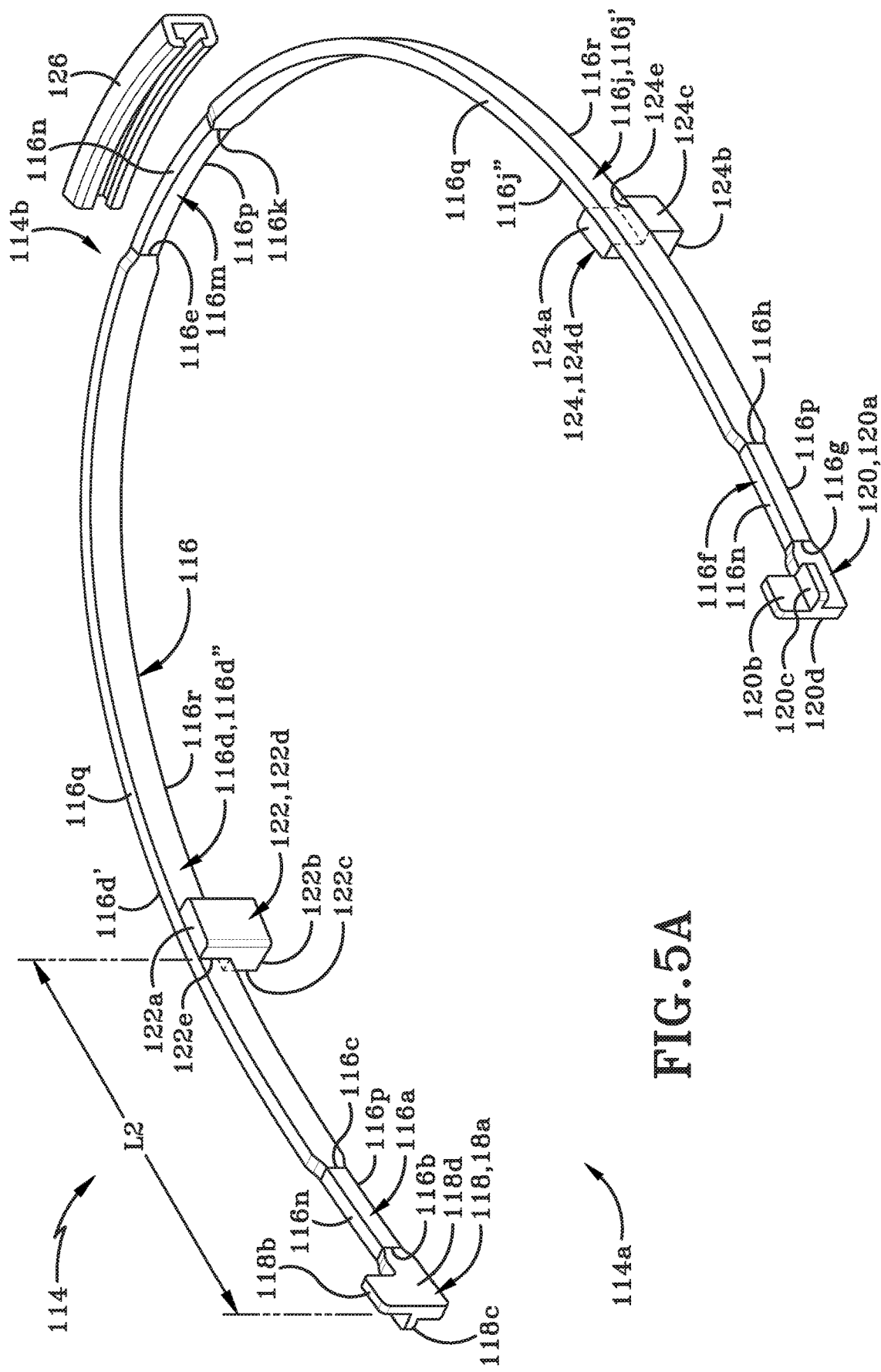
FIG. 5A is a top, front, perspective view of the eyeglass retention device of FIG. 5 shown on its own and showing a different configuration of the first and second temporal supports provided on the device.

Referring now to FIGS. 5 and 5A there is shown a second embodiment of an eyeglass retention and suspension device in accordance with the present disclosure, generally indicated by the reference number 114. Device 114 is substantially identical in structure and function to device 14 except for the features that will be described hereafter. Device 114 includes a base 116, first and second front supports 118, 120, and first and second temporal supports 122, 124. A weight 126 is shown engaged with base 116 but may be omitted therefrom. Weight 126 may be of a substantially similar function to weight 26 on base 16.

Base 116 is substantially identical in structure and function to base 16. Base 116 is generally U-shaped when viewed from above as best seen in FIG. 5A. Base 116 may be a unitary, monolithic component that is shaped to include several different regions. These regions include a right front region 116a having a first end 116b and a second end 116c. First front support 118 is operatively engaged with first end 116b and extends forwardly therefrom. A right arm region 116d extends from second end 116c to a rear end 116e. Base 116 further includes a left front region 116f having a first end 116g and a second end 116h. Second front support 120 is operatively engaged with first end 116g and extends forwardly therefrom. A left arm region 116j extends from second end 116h to a rear end 116k. A rear region 116m extends between rear end 116e and rear end 116k. Right arm region 116d and left arm region 116j are arcuate or curved in configuration. Additionally, the entire lengths of right arm region 116d and left arm region 116j are located in the same plane and inner surfaces 116d" and 116j" are opposed. Right front region 16a, left front region 16f and rear region 16m may be bendable.

In accordance with an aspect of the present disclosure, base 116 is symmetrical and first end 116b is laterally aligned with first end 116g, second end 116c is laterally aligned with second end 116h, and rear end 116e is laterally aligned with rear end 116k. First front support 118 and second front support 120 are laterally aligned with each other, as are first temporal support 122 and second temporal support 124.

Right front region 116a and left front region 116f are structurally substantially identical to each other and are arranged as mirror images of each other. Each of the right front region 116a and left front region 116f has an upper surface 116n and a lower surface 116p. The upper surfaces 116n are vertically aligned with each other and the lower surfaces 116p are vertically aligned with each other. The right front region 116a and left front region 116f extend forwardly from the second ends 116c, 116h, and may also angle inwardly toward each other to a certain degree. Right arm region 116d and left arm region 116j are substantially identical in structure but are arranged as mirror images of each other. Each of the right arm region 116d and left arm region 116j has an upper surface 116q and a lower surface 116r. The upper surfaces 116q are vertically aligned with each other and the lower surfaces 116r are vertically aligned with each other. The right arm region 116d and left arm region 116j taper downwardly in height proximate the respective second ends 116c, 116h, and rear ends 116e, 116k.

The rear region 116m extends between rear end 116e and rear end 116k and has an upper surface 116n and a lower surface 116p that are vertically aligned with the upper surfaces 116n and lower surfaces 116p of the right front region 116a and left front region 116f. All other features of the structure and function of base 116 are identical or substantially identical to base 16.

First and second front supports 118, 120 are substantially identical in structure, placement, and function to first and second front supports 18, 20. First front support 118 includes a first leg 118a (FIG. 5A) that is substantially identical to first leg 18a and first leg 120a, a second leg 118b that is substantially identical to second leg 18b and second leg 120b, and an arm 118c that is substantially identical to arm 18c and arm 120c. The first leg 118a and second leg 118b of first front support 118 present a flat inner surface 118d that is positioned closest to the person's head 12 when device 114 is worn and present an outer surface (not numbered) that is remote therefrom. The arm 118c extends outwardly from the outer surface of first leg 118a and second leg 118b and in a direction extending away from the person's head 12. The arm 118c is at an angle relative to first leg 118a and second leg 118b that is suitable for supporting arm 10c of eyeglasses 10 thereon. Similarly, the arm 120c extends outwardly from the outer surface of first leg 120a and second leg 120b and in a direction extending away from the person's head 12 (and in the opposite direction to arm 118c). The arm 120c is at an angle relative to first leg 120a and second leg 120b that is suitable for supporting arm 10d of eyeglasses 10 thereon.

Device 114 differs from device 14 in that the structure and placement of first and second temporal supports 122, 124 differs from the structure and placement of first and second temporal supports 22, 24. First and second temporal supports 22, 24 are horizontal plates but first and second temporal supports 122, 124 are L-shaped components. First temporal support 122 has an upper surface 122a, a lower surface 122b, an outer surface 122c, and an inner surface 122d. An L-shaped notch 122c, 124c is defined in each of the first and second temporal supports 122, 124. Base 116 is received in notches 122e, 124e. Second temporal support 124 has an upper surface 124a, a lower surface 124b, an outer surface 124c and an inner surface 124d. An L-shaped notch 122c, 124c is defined in each of the first and second temporal supports 122, 124. Base 116 is received in notches 122e, 124e.

First and second temporal supports 122, 124 are engaged on base 116 in such a way that a portion of each support 122, 124 extends downwardly for a distance below the lower surface 116r of base 116 instead of being located above upper surface 116q of base 116 like the plates of first and second temporal supports 22, 24 on base 16. The positioning of lower surfaces 122b, 124b is thus lower relative to the upper surface of arms 118c, 120c and consequently even more lifting force may be applied by the height differential between first and second front supports 118, 120 and first and second temporal supports 122, 124 than is possible with the height differential between first and second front supports 18, 20 and first and second temporal supports 22, 24.

A further difference between device 114 and device 14 is that first and second temporal supports 122, 124 are positioned a distance "L2" from a leading end of the associated first and second front supports 118, 120, where "L2" is greater than "L1" (FIG. 3D). Because of this, when device 114 is in use, the first and second temporal supports 122, 124 will be located behind the person's ears 12f instead of in front of the person's ears 12f like in device 14.

Device 114 is placed on the head 12 in substantially the same manner as device 14 except that the first and second temporal supports 122, 124 will contact the head 12 rearwardly of the ears 12f. Eyeglasses 10 are interlocking engaged with device 114 in the same manner as with device 141 and eyeglasses 10 are supported by device 114 in the same manner as described earlier herein with respect to device 14. In other words, the arms 10c, 10d pass under the lower surfaces 122b, 124b of the first and second temporal supports 122, 124 and over the upper surfaces of the horizontal arms 118c, 120c on the first and second front supports 118, 120. The arms 118c, 120c again act as a fulcrum for the lifting action provided by device 114 with a lifting force "E1" being applied by arms 118c, 120c and a downward force "E2" being applied by first and second temporal supports 122, 124. (An outward pushing force similar to force "A" (FIG. 3B) is applied by first and second front supports 118, 120 and an inward pressing force similar to force "B" is applied by first and second temporal supports 122, 124.) The engagement of eyeglasses 10 and device 114 thus results in nose pads 10f being lifted off the nose 12e in the direction indicated by arrow "E3" (FIG. 5). The weight of the eyeglasses 10 that typically would be borne by the person's nose 12e will then be transferred to device 114. The device 114 may also cause the arms 10c, 10d being lifted a short distance off the ears 12f.

Figure 6:
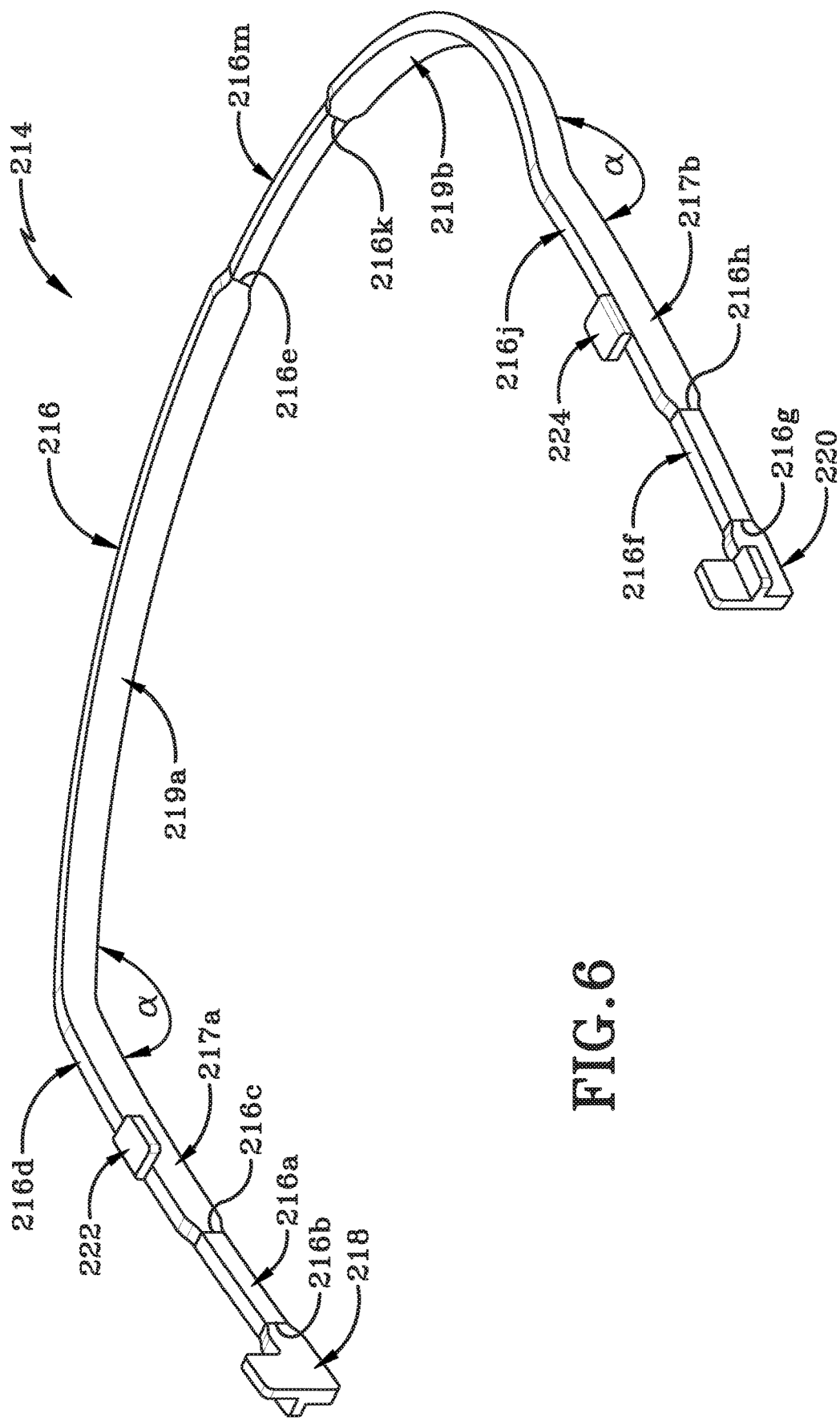
FIG. 6 is a top, front, perspective view of a third embodiment of the eyeglass retention device shown on its own.
Figure 7:
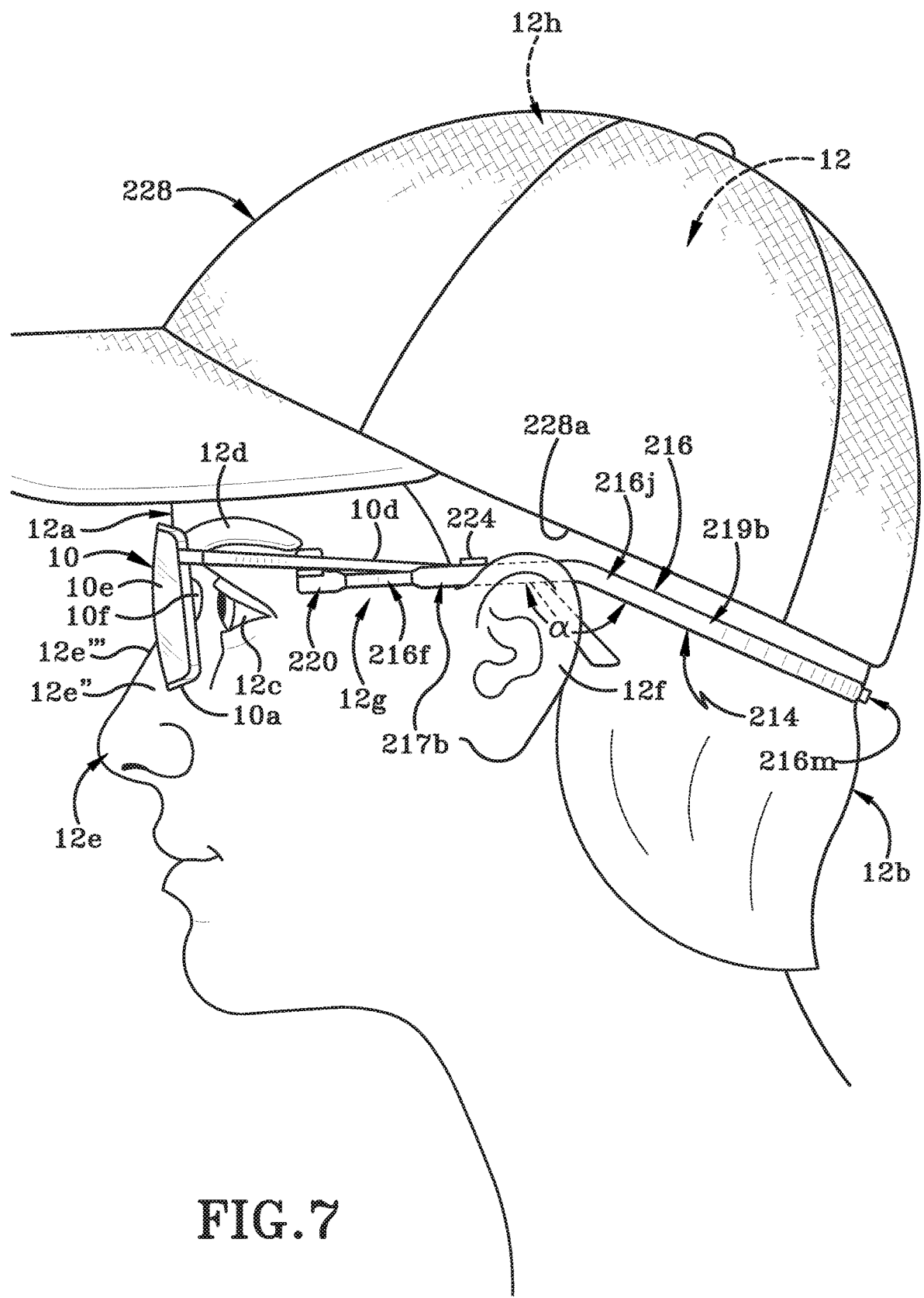
FIG. 7 is a left side elevation view of the eyeglass retention device of FIG. 6 being used to retain and suspend a pair of eyeglasses on a person's head, and showing that a rear region of the eyeglass retention device is positioned below a bottom edge of a cap that the person is wearing.

Referring now to FIGS. 6 and 7 there is shown a third embodiment of an eyeglass retention and suspension device in accordance with the present disclosure, generally indicated by the reference number 214. Device 214 is substantially identical in structure and function to device 14 except for the features that will be described hereafter. Device 214 includes a base 216, first and second front supports 218, 220, and first and second temporal supports 222, 224. First and second front supports 218, 220 are substantially identical in structure and function to first and second front supports 18, 20. First and second temporal supports 222, 224 are substantially identical in structure and function to first and second temporal supports 22, 24.

Base 216 is substantially identical in structure and function to base 16 except for the following features. Base 216 is generally U-shaped when viewed from above and includes a right front region 216a having a first end 216b and a second end 216c. First front support 218 is operatively engaged with first end 216b and extends forwardly therefrom. A right arm region 216d extends from second end 216c to a rear end 216e. Base 216 further includes a left front region 216f having a first end 216g and a second end 216h. Second front support 220 is operatively engaged with first end 216g and extends forwardly therefrom. A left arm region 216j extends from second end 216h to a rear end 216k. A rear region 216m extends between rear end 216e and rear end 216k.

Right arm region 216d and left arm region 216j are arcuate or curved in configuration but instead of the entire lengths thereof being located in the same plane, (as is the case with right arm region 16d and left arm region 16j), a forward portion of each of the right and left arm regions 216d, 216j is located in a first plane and a rearward portion of each of the right and left arm regions 216d, 216j angles downwardly therefrom and is not located in the first plane. This is best seen in FIG. 7. In particular, right arm region 216d includes a forward portion 217a and a rearward portion 219a. The forward portion 217a is located in the same plane as right front region 216a. Rearward portion 219a is oriented at an angle α relative to the forward portion 217a. The angle α as illustrated is about 135° but it will be understood that any other suitable obtuse angle may be utilized instead where that obtuse angle enables the base 216 to pass around the back of the user's head. Similarly, the left arm region 216j includes a forward portion 217b and a rearward portion 219b. The forward portion 217b is located in the same plane as left front region 216f (and right front region 216a) and the rearward portion 219b of left arm region 216j is oriented at an angle α relative to the forward portion 217b thereof.

The configuration of device 214 is such that when worn by the person, the rearward portions 219a, 219b and rear region 216m are located lower down on the back 12b of the person's head 12 than the position of the right and left arm regions 216d, 216j of device 14. The first and second front supports 218, 220 are located laterally spaced from but adjacent a rear region of the eyebrows 12d or temples 12g and the first and second temporal supports 222, 224 contact the temples 12g forward of the ears 12f. Eyeglasses 10 are engaged with device 214 and are supported thereby in the same manner as described earlier herein with respect to device 14. In other words, the arms 10c, 10d pass under the lower surfaces of the first and second temporal supports 222, 224 and over the upper surfaces of the horizontal arms on the first and second front supports 218, 220. The engagement of eyeglasses 10 and device 214 results in nose pads 10f being lifted off the nose 12e and may result in the arms 10c, 10d being lifted a short distance off the ears 12f. The configuration and the position device 214 is worn on the head 12 enables the person to wear a cap 228 without the bottom edge 228a of cap 228 interfering with device 214.

It will be understood that in other examples, the position of the first and second temporal supports 222, 224 on base 216 may be such that the supports 222, 224 will contact the person's head rearwardly of the ears 12f.

Figure 8:
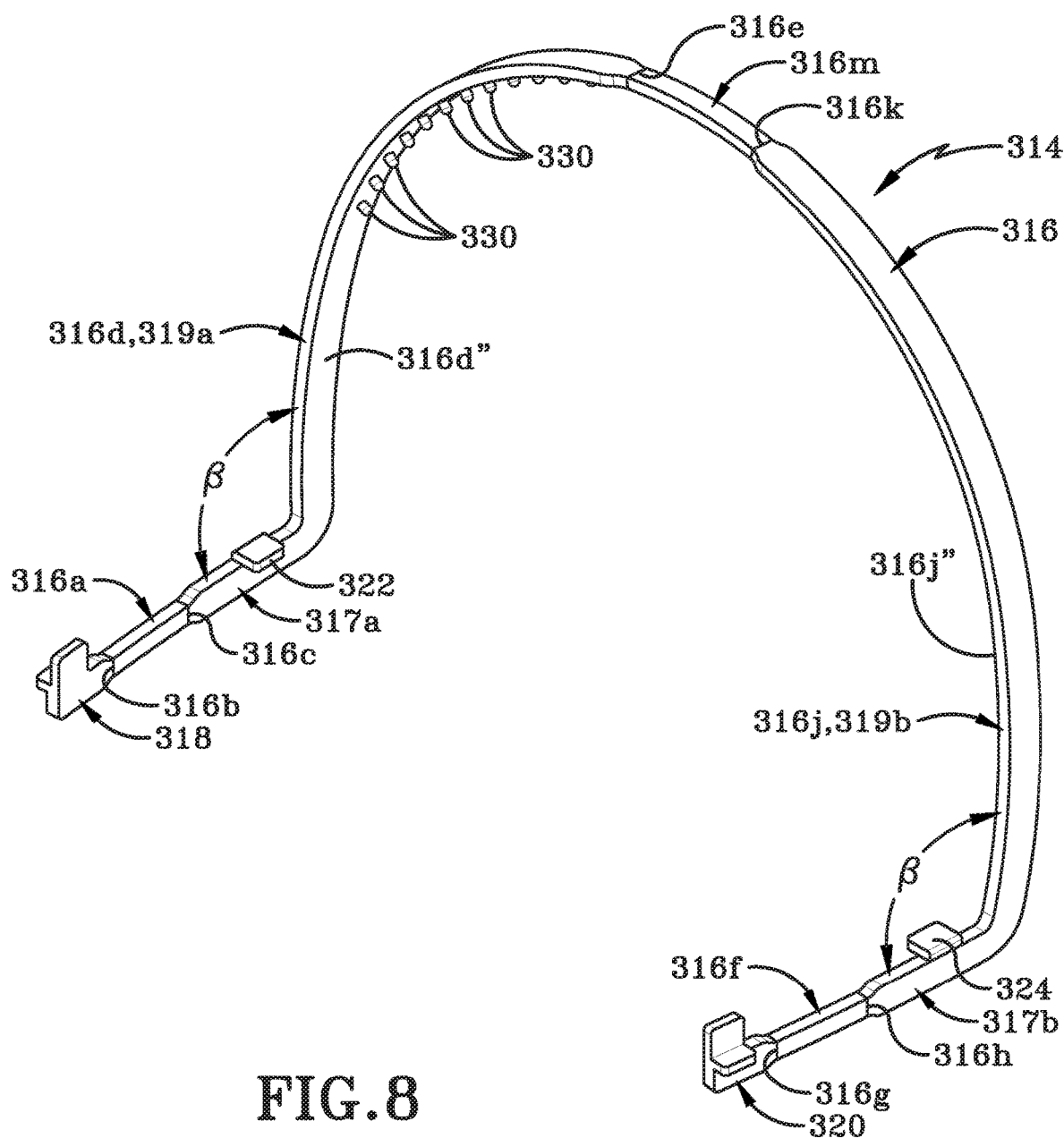
FIG. 8 is a top, front, perspective view of a fourth embodiment of the eyeglass retention device shown on its own.
Figure 9:
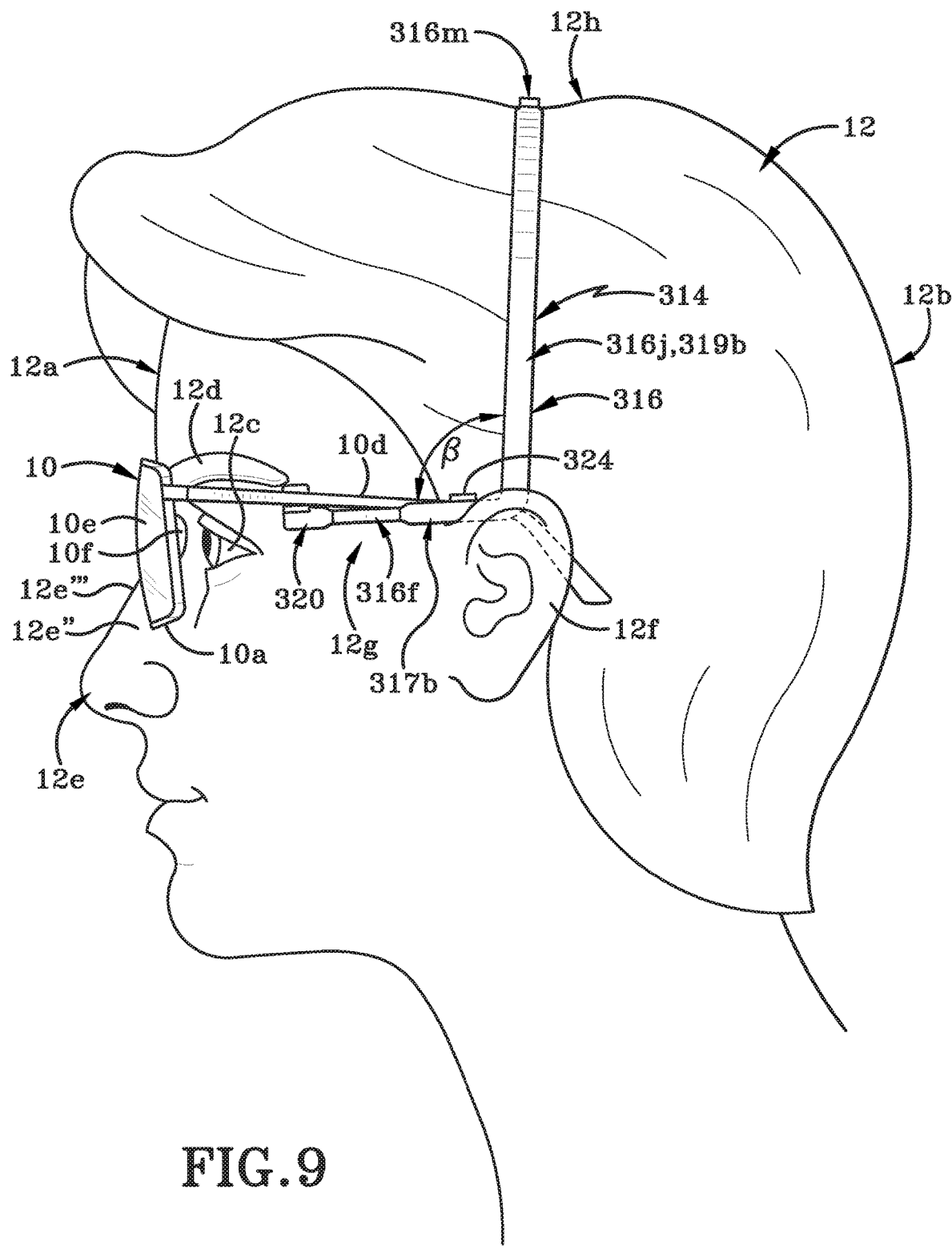
FIG. 9 is a left side elevation view of the eyeglass retention device of FIG. 8 being used to retain and suspend a pair of eyeglasses on a person's head.

Referring now to FIGS. 8 and 9 there is shown a fourth embodiment of an eyeglass retention and suspension device in accordance with the present disclosure, generally indicated by the reference number 314. Device 314 is substantially identical in structure and function to device 14 and substantially similar to the device 214 except for the features that will be described hereafter. Device 314 includes a base 316, first and second front supports 318, 320, and first and second temporal supports 322, 324. First and second front supports 318, 320 are substantially identical in structure and function to first and second front supports 18, 20. First and second temporal supports 322, 324 are substantially identical in structure and function to first and second temporal supports 22, 24.

Base 316 is substantially identical in structure and function to base 16 and base 216 except for various features described hereafter. Base 316 is generally U-shaped and includes a right front region 316a having a first end 316b and a second end 316c. First front support 318 is operatively engaged with first end 316b and extends forwardly therefrom. A right arm region 316d extends from second end 316c to a rear end 316e. Base 316 further includes a left front region 316f having a first end 316g and a second end 316h. Second front support 320 is operatively engaged with first end 316g and extends forwardly therefrom. A left arm region 316j extends from second end 316h to a rear end 316k. A rear region 316m extends between rear end 316e and rear end 316k.

Right arm region 316d and left arm region 316j are arcuate or curved in configuration but instead of the entire lengths thereof being located in the same plane, (as is the case with right arm region 16d and left arm region 16j), a forward portion of each of the right and left arm regions 316d, 316j is located in a first plane and a rearward portion of each of the right and left arm regions 316d, 316j angles upwardly therefrom. In particular, right arm region 316d includes a forward portion 317a and a rearward portion 319a. The forward portion 317a is located in the same plane as right front region 316a. Rearward portion 319a is oriented at an angle β relative to the forward portion 217a. Similarly, the left arm region 316j includes a forward portion 317b and a rearward portion 319b. The forward portion 317b is located in the same plane as left front region 316f (and right front region 316a) and the rearward portion 319b of left arm region 316j is oriented at an angle β relative to the forward portion 317b thereof such that the rearward portion 319b extends upwardly from forward portion 317b.

Device 314 also differs from the previously described devices in that a plurality of nodules 330 are integrally formed with the inner surfaces 316d'' and 316j'' and extend outwardly therefrom for a distance. In particular, the nodules 330 are spaced at intervals from each other and a provided on the rearward portions 319a, 319b of the respective one of the right arm region 316d and left arm region 316j. The nodules are provided to increase the ability of device 314 to grip the person's head 12. Nodules 330 may be provided on just some of each rearward portion 319a, 319b or along substantially the entire length thereof. Any other suitable ways of improving the gripping ability of device 314 may be utilized. In one example, a material, such as rubber, or a material having a texture, may be utilized on the inner surface 316d'' and 316j'' instead of providing nodules 330. The nodules 330 may also be replaced with ribs in another example. It should be understood that the nodules 330 or other ways of improving the gripping ability may be utilized on any of the eyeglass retention and suspension devices described herein.

The configuration of device 314 is such that when worn by the person, the rearward portions 319a, 319b and rear region 316m extend upwardly from proximate the upper regions of the person's ears 12f and over the top 12h of their head 12. This is best seen in FIG. 9. The nodules 330 will grippingly engage the person's head and the first and second temporal supports 322, 324 will contact the person's temples 12g. Eyeglasses 10 are engaged with device 314 and are supported thereby in the same manner as described earlier herein with respect to device 14. In other words, the arms 10c, 10d pass under the lower surfaces of the first and second temporal supports 322, 324 and over the upper surfaces of the horizontal arms on the first and second front supports 318, 320. The engagement of eyeglasses 10 and device 314 results in nose pads 10f being lifted off the nose 12e and may result in the arms 10c, 10d being lifted a short distance off the ears 12f.

It will be understood that in other examples, the position of the first and second temporal supports 322, 324 on base 316 may be such that the supports 322, 324 will contact the person's head rearwardly of the ears 12f.

Figure 10:
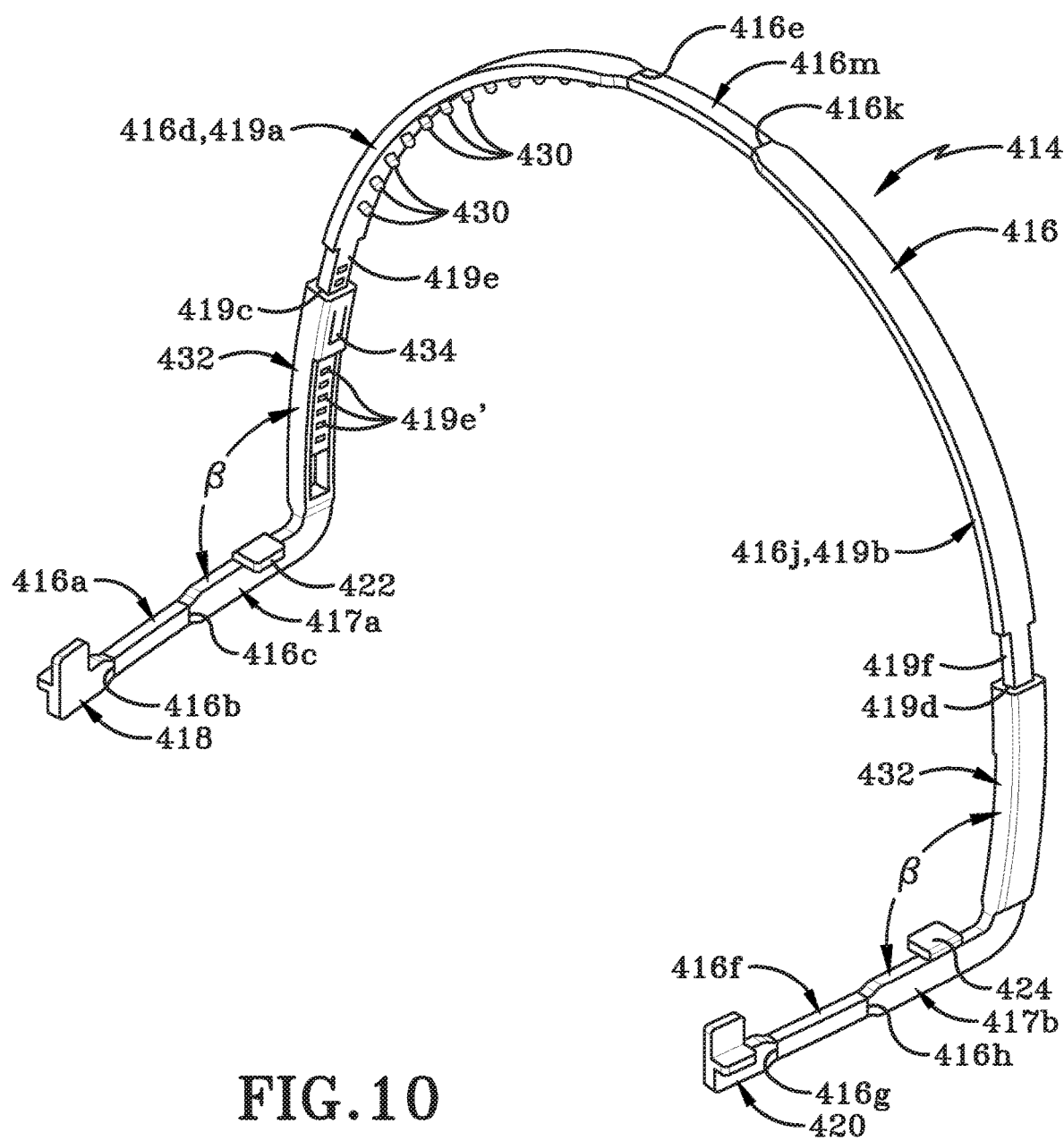
FIG. 10 is a top, front, perspective view of a fifth embodiment of the eyeglass retention device shown on its own.

Referring now to FIG. 10 there is shown a fifth embodiment of an eyeglass retention and suspension device in accordance with the present disclosure, generally indicated by the reference number 414. Device 414 is substantially identical in structure and function to device 314 except for differences that will be described hereafter. Device 414 includes a base 416, first and second front supports 418, 420, and first and second temporal supports 422, 424. First and second front supports 418, 420 are substantially identical in structure and function to first and second front supports 18, 20. First and second temporal supports 422, 424 are substantially identical in structure and function to first and second temporal supports 22, 24.

Base 416 is substantially identical in structure and function to base 316 except for various features described hereafter. Base 416 is generally U-shaped and includes a right front region 416a having a first end 416b and a second end 416c. First front support 418 is operatively engaged with first end 416b and extends forwardly therefrom. A right arm region 416d extends from second end 416c to a rear end 416e. Base 416 further includes a left front region 416f having a first end 416g and a second end 416h. Second front support 420 is operatively engaged with first end 416g and extends forwardly therefrom. A left arm region 416j extends from second end 416h to a rear end 416k. A rear region 416m extends between rear end 416e and rear end 416k.

Right arm region 416d and left arm region 416j are arcuate or curved in configuration but instead of the entire lengths thereof being located in the same plane, (as is the case with right arm region 16d and left arm region 16j), a forward portion of each of the right and left arm regions 416d, 416j is located in a first plane and a rearward portion of each of the right and left arm regions 416d, 416j angles upwardly therefrom. In particular, right arm region 416d includes a forward portion 417a and a rearward portion 419a. The forward portion 417a is located in the same plane as right front region 416a. Rearward portion 419a is oriented at an angle β relative to the forward portion 417a. Similarly, the left arm region 416j includes a forward portion 417b and a rearward portion 419b. The forward portion 417b is located in the same plane as left front region 416f (and right front region 416a) and the rearward portion 419b of left arm region 416j is oriented at an angle β relative to the forward portion 417b thereof such that the rearward portion 419b extends upwardly from forward portion 417b. Nodules 430 are provided on rearward portions 419a, 419b. The configuration of device 414 is such that when worn by the person, the rearward portions 419a, 419b and rear region 416m extend upwardly from proximate the upper regions of the person's ears 12f and over the top 12h of their head 12.

Device 414 differs from device 314 in that the rearward portions 419a, 419b include an adjustment mechanism, generally indicated by the reference number 432. The adjustment mechanism 432 may be of any construction that will enable the length of rearward portions 419a, 419b to be adjusted in length. As illustrated, a first section of rearward portion 419a is integrally formed with forward portion 417a. Similarly, a first section of rearward portion 419b is integrally formed with forward portion 417b. These first sections each define an interior bore that is accessible through an opening 419c, 419d. The second section of each of the rearward portions 419a, 419b is of reduced dimensions relative to the rest of the rearward portions 419a, 419b. The reduced dimension second section is identified by the reference numbers 419e, 419f, respectively. The second sections 419e, 419f are each provided with a plurality of locking ribs thereon, such as the ribs 419e' shown in FIG. 10. Each second section 419e, 419f is slidably received into the bores of the respective first sections of the rearward portions 419a, 419b through the associated opening 419c or 419f. The user may decrease the overall length of rearward portion 419a, 419b by pushing downwardly thereon and moving the second sections 419e, 419f further into the bores. The user may increase the overall length of the rearward portion 419a, 419b by pulling upwardly thereon and moving the second sections 419e, 419f further out of the bores. The locking ribs 419e' will hold the rearward portions 419a, 419b at a set position. Pushing downwardly on the rearward portions 419a, 419b can simply be undertaken to reduce the overall length thereof. However, in order to withdraw the second sections 419e, 419f further outwardly from the bores and increase the overall length of the rearward portions 419a, 419b, the locking member 434 first needs to be depressed to disengage the locking ribs 419e'.

Device 414 is placed on the person's head 12 in such a way that the second sections 419a, 419b and rear region 416m pass over the sides and top 12h of the person's head 12 and the first and second front supports 418, 420 are positioned adjacent but laterally spaced from the rearmost regions of the person's eyebrows 12d. The first and second temporal supports 422, 424 contact the person's temples 12g slightly forward of the ears 12f. Eyeglasses 10 are engaged with device 414 and are supported thereby in the same manner as described earlier herein with respect to device 14. In other words, the arms 10c, 10d pass under the lower surfaces of the first and second temporal supports 422, 424 and over the upper surfaces of the horizontal arms on the first and second front supports 418, 420. The engagement of eyeglasses 10 and device 414 results in nose pads 10f being lifted off the nose 12e and may result in the arms 10c, 10d being lifted a short distance off the ears 12f.

Figure 11:
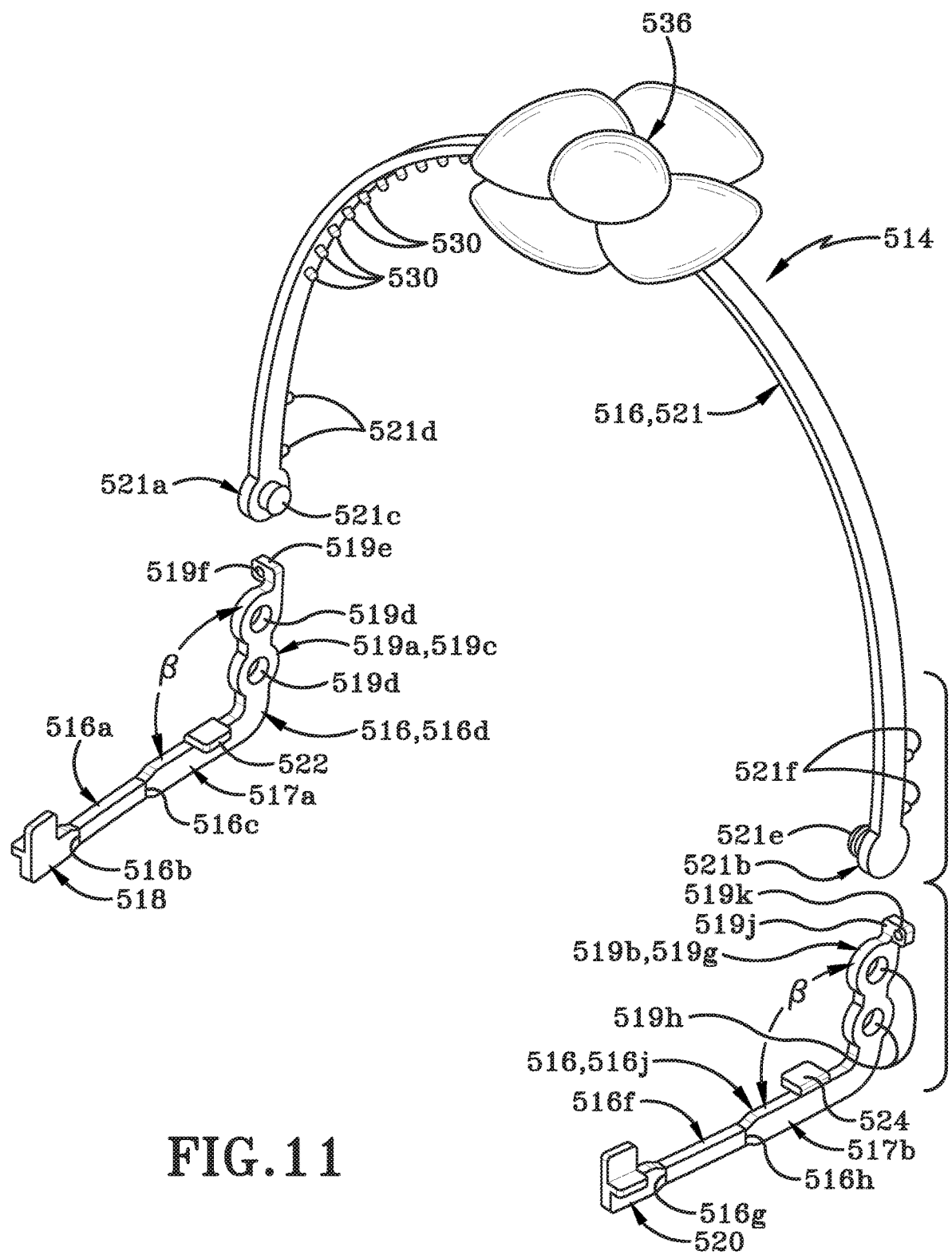
FIG. 11 is a partially exploded top, front, perspective view of a sixth embodiment of the eyeglass retention device shown on its own.

Referring to FIG. 11 there is shown a sixth embodiment of an eyeglass retention and suspension device in accordance with the present disclosure, generally indicated by the reference number 514. Device 514 is substantially identical in structure and function to device 414 except for differences that will be described hereafter. Device 514 includes a base 516, first and second front supports 518, 520, and first and second temporal supports 522, 524. First and second front supports 518, 520 are substantially identical in structure and function to first and second front supports 18, 20. First and second temporal supports 522, 524 are substantially identical in structure and function to first and second temporal supports 22, 24.

Parts of base 516 are substantially identical in structure and function to base 416 except for various features described hereafter. Base 516 is generally U-shaped and is configured to pass over the top 12h of the person's head 12. Base 516 includes a right front region 516a having a first end 516b and a second end 516c. First front support 518 is operatively engaged with first end 516b and extends forwardly therefrom. A right arm region 516d is provided that is generally L-shaped having a first leg 517a and a second leg 519a that are oriented at an angle β relative to each other. First leg 517a resembles the front end of right arm region 416d of device 414. Second arm 519a includes a figure-eight component 519c which defines a pair of apertures 519d therein. Apertures 519d extend from an inner surface of second leg 519a through to an outer surface thereof. Second leg 519a further includes a tab 519e at an end thereof. Tab 519e extends in a direction from the inner surface to the outer surface of the second leg 519a and defines a hole 519f therein. Hole 519f extends from a forward surface of the tab 519e through to a rear surface thereof. Hole 519f is therefore oriented at right angles to apertures 519d.

Base 516 further includes a left front region 516f having a first end 516g and a second end 516h. Second front support 520 is operatively engaged with first end 516g and extends forwardly therefrom. A left arm region 516j is provided that is generally L-shaped having a first leg 517b and a second leg 519b that are oriented at an angle β relative to each other. First leg 517b resembles the front end of left arm region 416j of device 414. Second arm 519b includes a figure-eight component 519g which defines a pair of apertures 519h therein. Apertures 519h extend from an inner surface of second leg 519b through to an outer surface thereof. Second leg 519b further includes a tab 519j at an end thereof. Tab 519j extends in a direction from the inner surface to the outer surface of the second leg 519b and defines a hole 519k therein. Hole 519k extends from a forward surface of the tab 519j through to a rear surface thereof. Hole 519k is therefore oriented at right angles to apertures 519h.

Base 516 further comprises a U-shaped third leg 521. Third leg 521 has a first end 521a and a second end 521b. First end 521a is detachably and adjustably engaged with first leg 519a of base 516. Second end 521b is detachably and adjustably engaged with second leg 519b of base 516. First end 521a and second end 521b include identical components which are arranged as mirror images of each other. First end 521a include a button 521c that is selectively receivable in one of the apertures 519d of second leg 519a and a pair of spaced apart bosses 521d that are selectively engageable in hole 519h on first leg 519a. Second end 521b includes a button 521e that is selectively engageable in one of the apertures 519h and a pair of spaced-apart bosses 521f that are selectively engageable in hole 519k of second leg 519b. The particular aperture 519d and 519h that is selected depends on whether it is desired to have base 516 be of a greater overall length or a lesser overall length. The two lowermost apertures 519d, 519h (i.e., those closest to the respective first leg 517a, 517b) is selected when a shorter base 516 is desired. The two uppermost apertures 519d, 519h (i.e., those closes to the tabs 519e, 519j) are selected when a higher base 516 is desired. Buttons 521d, 521e are pushed into the selected uppermost or lowermost apertures 519d, 519. This engagement will automatically position one of the two bosses 521d, 521f in alignment with the respective hole 519f, and 519k. The double attachment (i.e., buttons in apertures along with bosses in holes) helps ensure a secure connection between third leg 521 and the first and second legs 519a, 519b. The device 514 is configured in such a way that third leg 521 will pass over the top 12h of the head 12.

A decorative element 536 is engaged with third leg 521. In this figure the decorative element 536 is a shaped like a flower but it will be understood that any decorative component may be utilized. The decorative element 536 is shown located generally centrally on third leg 522 but it will be understood that any other position be selected instead.

A plurality of nodules 530 substantially identical to nodules 330 are provided on an inner surface of third leg 521. Nodules 530 serve the same purpose as nodules 330.

Device 514 is placed on the person's head 12 in such a way that the third leg 521 passes over the sides and top 12h of the person's head 12 and the first and second front supports 518, 520 are positioned adjacent but laterally spaced from the rearmost regions of the person's eyebrows 12d. The first and second temporal supports 522, 524 contact the person's temples 12g slightly forward of the ears 12f. Eyeglasses 10 are engaged with device 514 and are supported thereby in the same manner as described earlier herein with respect to device 514. In other words, the arms 10c, 10d pass under the lower surfaces of the first and second temporal supports 522, 524 and over the upper surfaces of the horizontal arms on the first and second front supports 518, 520. The engagement of eyeglasses 10 and device 514 results in nose pads 10f being lifted off the nose 12e and may result in the arms 10c, 10d being lifted a short distance off the ears 12f.

Figure 12:
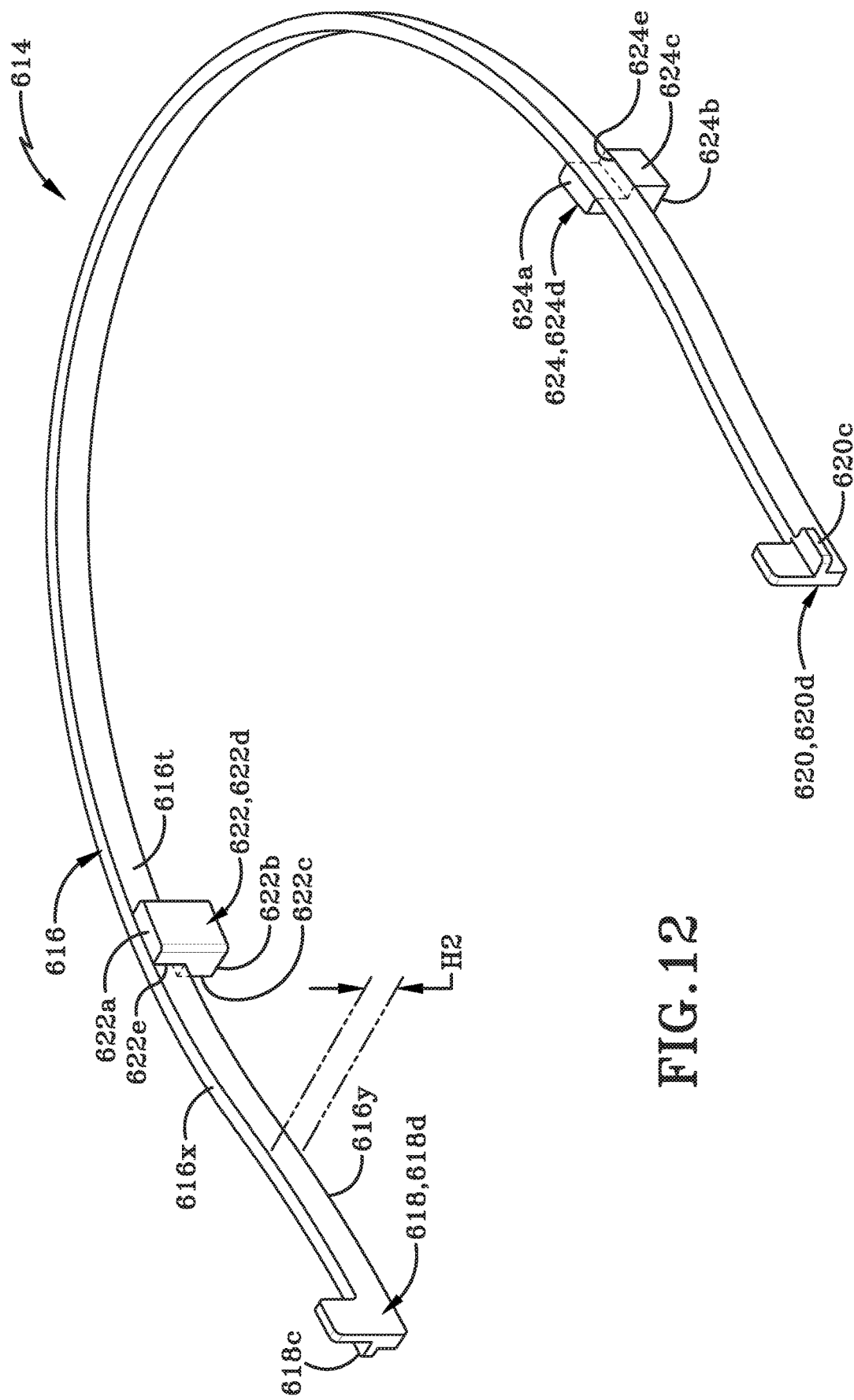
FIG. 12 is a top, front, perspective view of a seventh embodiment of the eyeglass retention device shown on its own.
Figure 13:
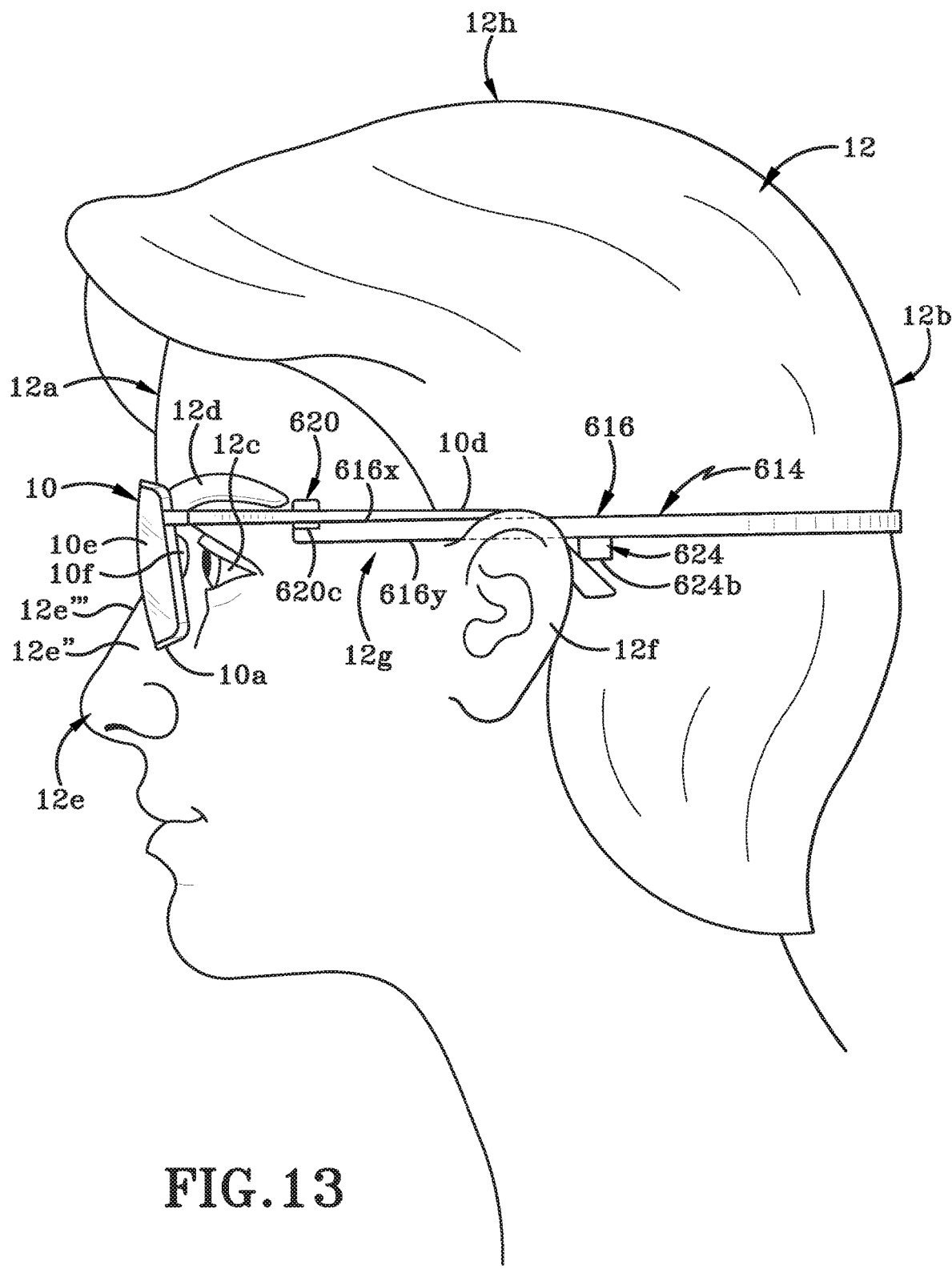
FIG. 13 is a left side elevation view of the eyeglass retention device of FIG. 12 being used to retain and suspend a pair of eyeglasses on a person's head.

Referring to FIGS. 12 and 13, there is shown a seventh embodiment of an eyeglass retention and suspension device in accordance with the present disclosure, generally indicated by the reference number 614. Device 614 is substantially identical in structure and function to device 14 except for differences that will be described hereafter. Device 614 includes a base 616, first and second front supports 618, 620, and first and second temporal supports 622, 624. Base 616, first and second front supports 618, 620, and first and second temporal supports 622, 624 form a unitary, monolithic component and may be produced by any suitable process such as injection molding. Base 616 is substantially U-shaped when viewed from above and is of a constant height from first front support 618 to second front support 620.

First and second front supports 18, 20 were previously described herein as including first legs 18a, 20a; second legs 18b, 20b, and a horizontally-extending arm 18c, 20c. In device 616, the equivalent components to first legs 18a, 20a and second legs 18b, 20b are integrally formed with the wall that comprises the rest of base 616 (except for first and second temporal supports 622, 624). The inner surface 618d, 620d of first and second front supports 618, 620 is flush with the inner surface 616t of the rest of base 616. The height "H2" between upper surface 616x and lower surface 616y is substantially constant between first front support 618 and second front support 620. A horizontal arm 618c, 620c extends outwardly from the outer surface of each of the first front support 618 and second front support 620, respectively. Arms 618c, 620c are shown positioned slightly above the upper surface 616x of base 616. Other positions for arms 618c, 620c may be utilized in other examples.

First and second temporal supports 622, 624 are substantially identical in structure and function to first and second temporal supports 122, 124. As such, first and second temporal supports 622, 624 are each substantially L-shaped and include an upper surface 622a, 624a, a lower surface 622b, 624b, an outer surface 622c, 624c, an inner surface 622d, 624, and define an L-shaped notch 622e, 624d therein. Base 616 is received in notches 622e, 624e. The first and second temporal supports 622, 624 are positioned on base 616 such that the inner surface 616t of base is seated in the notches 622e, 624e. The inner surfaces 622d, 624d of the first and second temporal supports 622, 624 are parallel to the inner surface 616t of base 616 and are spaced inwardly from the inner surface 616t. Upper surfaces 622a, 624a are flush or substantially flush with upper surface 616x of base 616. Lower surfaces 622b, 624b are located a distance below the lower surface 616y of base 616.

Device 614 is placed on the person's head 12 in such a way that the base 616 passes around the sides and back 12b of the person's head 12. The first and second front supports 618, 620 are positioned adjacent but laterally spaced from the rearmost regions of the person's eyebrows 12d. The inner surfaces 622d, 624d of first and second temporal supports 622, 624 contact the person's head slightly rearwardly of the ears 12f. The supports 622, 624 contact the head 12 in this location because the distance between the leading end of the first and second front supports 618, 620 and the leading end of first and second temporal supports is "L2", i.e., similar to the distance in device 114 shown in FIG. 5. It will, of course be understood that the first and second temporal supports 622, 624 may, in other examples, be located a distance "L1" from first and second front supports 618, 620 and then the supports 622, 624 will contact the head 12 forward of the ears 12f.

Eyeglasses 10 are engaged with device 614 and are supported thereby in the same manner as described earlier herein with respect to device 114. In other words, the arms 10c, 10d pass over the upper surfaces of the horizontal arms 618c, 620c on the first and second front supports 618, 620 and under the lower surfaces 622b, 624b of the first and second temporal supports 622, 624. Arms 618c, 620c act as fulcrums and lift eyeglasses 10 in a similar manner to what has been described earlier herein. The engagement of eyeglasses 10 and device 614 results in nose pads 10f being lifted off the nose 12e, either vertically and/or horizontally, and may result in the arms 10c, 10d also being lifted a short distance off the ears 12f. The weight of eyeglasses 10 that would typically be borne by the nose 12e is transferred to device 614.

Figure 14:
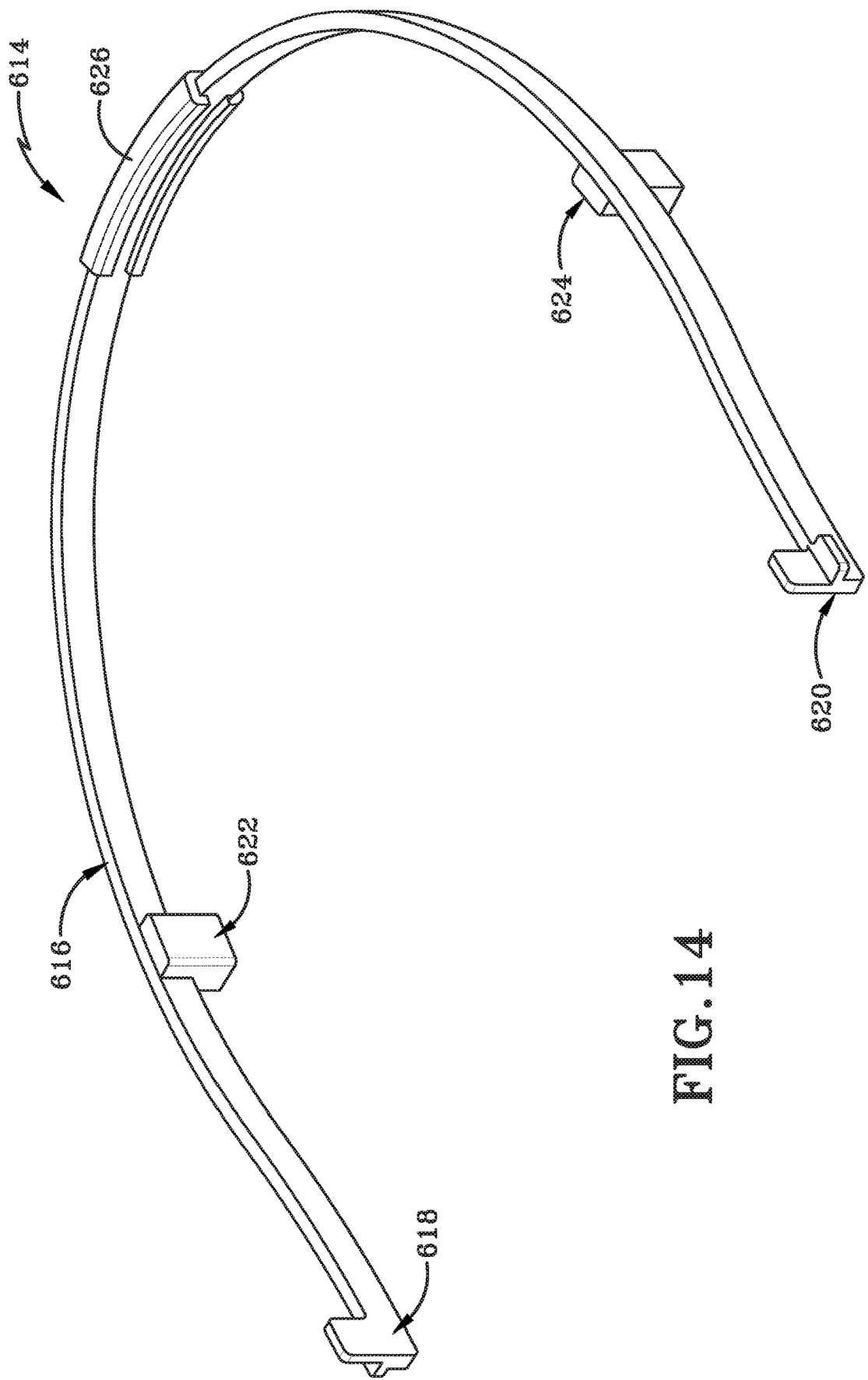
FIG. 14 is a top, front, perspective view of the device of FIG. 12 shown with a weight engaged therewith.

FIG. 14 shows the device 614 that has a weight 626 engaged with base 616. Weight 626, as described earlier herein, may be utilized to counterbalance at least some of the weight of eyeglasses 10 that are operatively engaged with device 614. Weight 626 may be permanently affixed to base 616 or may be selectively removable therefrom.

Figure 15:
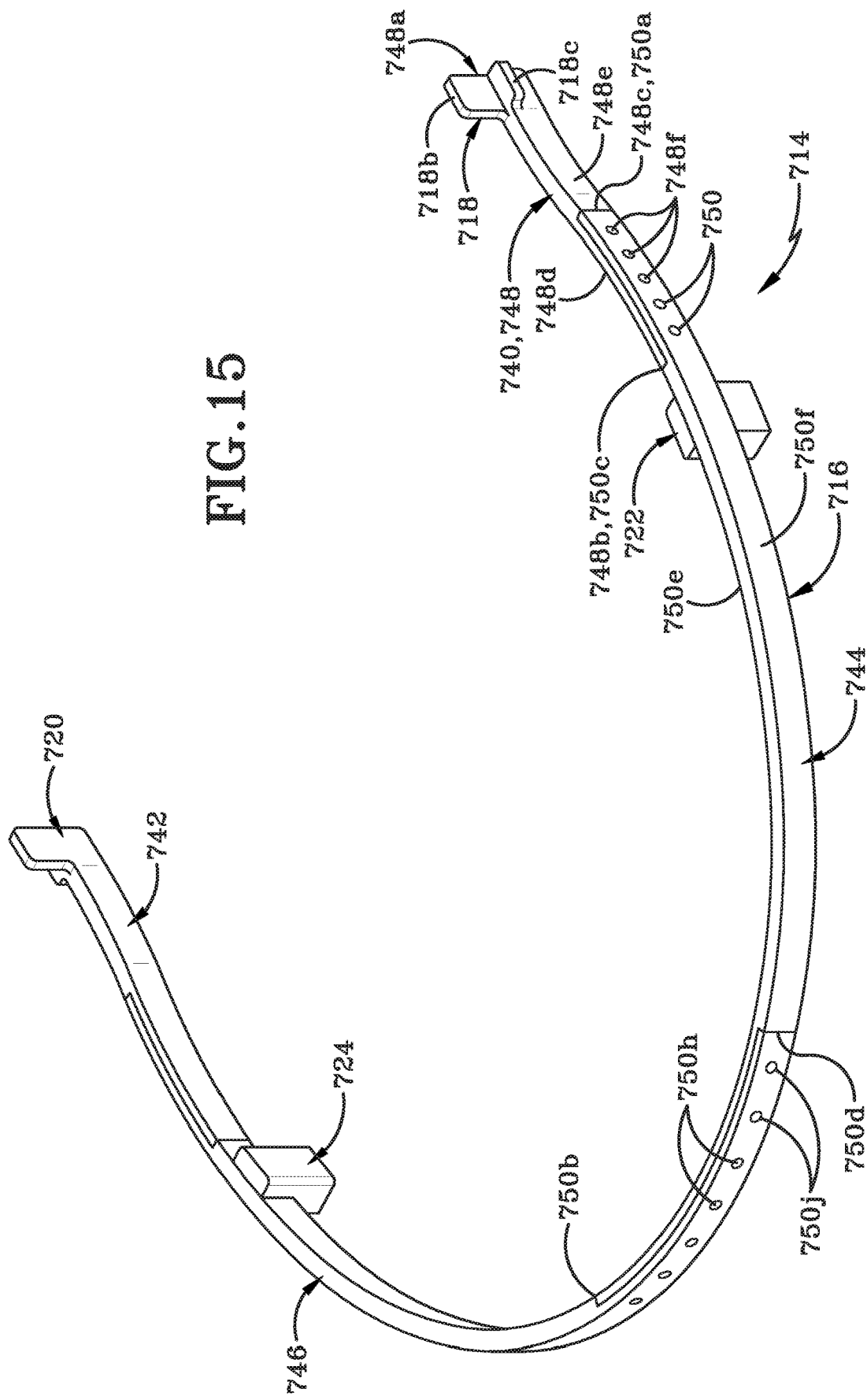
FIG. 15 is a top, rear, perspective view of an eighth embodiment of the eyeglass retention device shown on its own.
Figure 16:
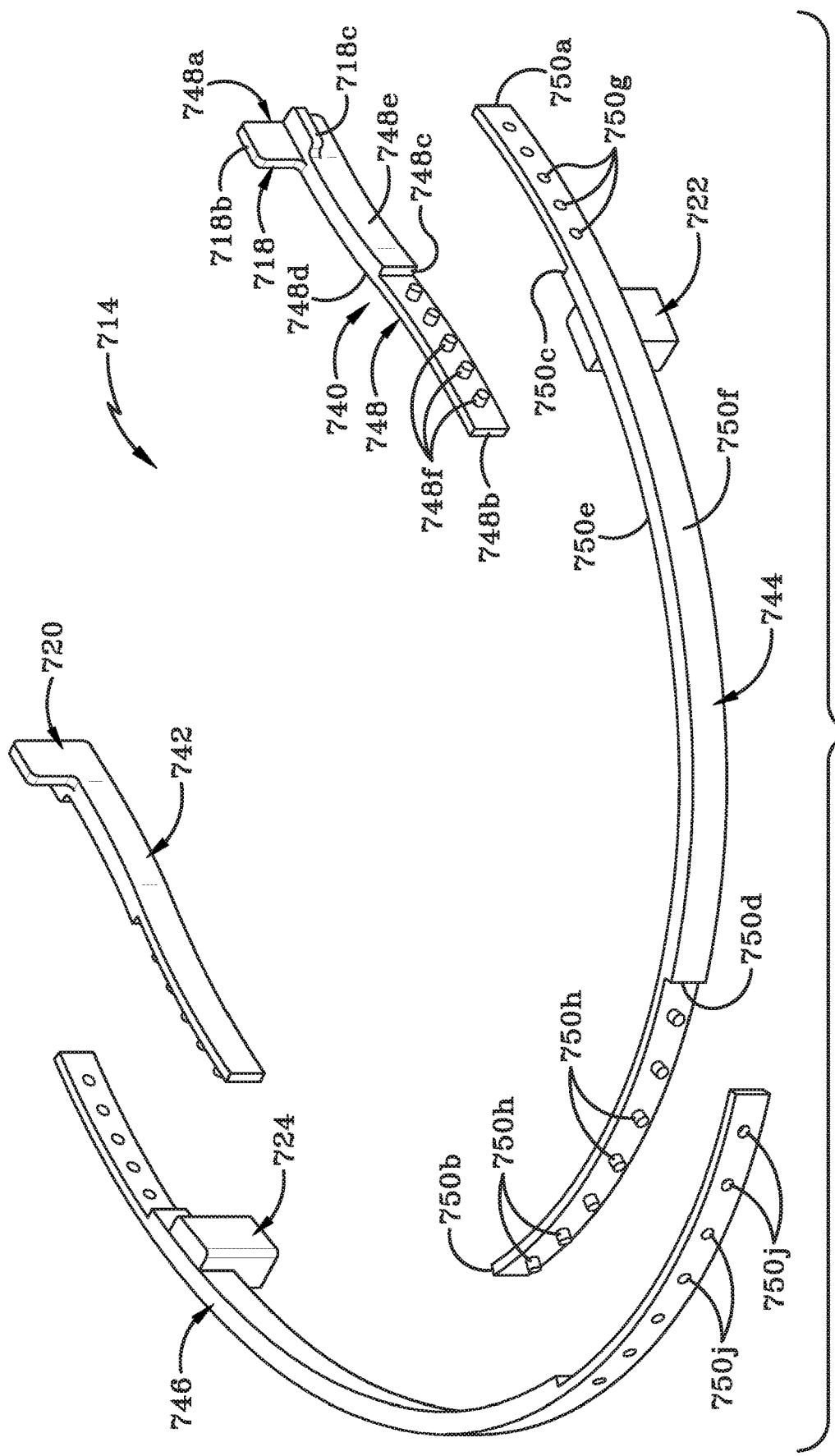
FIG. 16 is an exploded, top rear, perspective view of the eyeglass retention device shown in FIG. 15.

FIGS. 15 and 16 show an eighth embodiment of an eyeglass retention and suspension device in accordance with the present disclosure, generally indicated by the reference number 714. Device 714 is an adjustable version of the device 614. Device 714 is comprised of a base 716, first and second front supports 718, 720, and first and second temporal supports 722, 724. These components are provided on four separate base sections, namely first base section 740, second base section 742, third base section 744, and fourth base section 746.

First and second base sections 740, 742 are identical in structure and function but are oriented in device 714 as mirror images of each other. Only first base section 740 will be described herein but it will be understood that the description applies equally to second base section. First base section 740 comprises a body 748 having a first end 748a, a second end 748b remote from first end 748b, and a shoulder 748c formed between first and second ends 748a, 748b. As illustrated, shoulder 748c is located approximately half way along the length of base piece 748 but it will be understood that shoulder 748c may be formed in other locations on body 748. Between first end 748a and shoulder 748c, the body 748 is thicker than between shoulder 748c and second end 748b. (The thickness is measured between an interior surface 748d and an exterior surface 748e.)

First front support 718 is integrally formed on first end 748a of the body 748. First front support 718, like all first front supports illustrated and described herein, includes a vertically extending wall 718b and a horizontally extending wall 718c. Like all other horizontally extending walls, wall 718c is configured and provided to support an arm 10c, 10d of eyeglasses thereon. Like all other vertically extending walls, wall 718b prevents the retained arms 10c or 10d of eyeglasses 10 from slipping laterally off the device.

Body 748 includes a plurality of buttons 748f that extend horizontally outwardly from the portion of exterior surface 748e that extends between shoulder 748c and second end 748b. Buttons 748f are spaced at intervals from each other. The purpose of buttons 748f will be described later herein.

Third and fourth base sections 744 and 746 and configured to engage first and second base sections 740, 742 and to engage each other. Third and fourth base sections 744, 746 are substantially identical except for certain features that will be described later herein. Because of the substantial similarities, only third base section 744 will be described in detail. Third base section 744 includes a body 750 that has a first end 750a and a remote second end 750b. A first shoulder 750c and a second shoulder 750d are provided between first end 750a and second end 750b. The distance between first end 750a and first shoulder 750c is approximately the same size as the distance between shoulder 748c and second end 748b on first base section 740. The portions of the body between first end 750a and first shoulder 750c and between second end 750b and second shoulder 750d are thinner than the portion of the body between first shoulder 750c and second shoulder 750d. The thickness is measured between interior surface 750e and exterior surface 750f.

A plurality of apertures 750g is defined between interior surface 750e and exterior surface 750f of body 750. The apertures 750g are spaced at regular intervals from each other. In particular, the spacing between apertures 750g is complementary to the spacing between buttons 748f on first base section 740. First base section 740 and third base section 744 are operatively engaged with each other by press-fitting some of buttons 748f into some of the apertures 750g. The specific apertures 750g that are utilized determines the overall length of the component that is formed by engaging first base section 740 with third base section 744.

The portion of the body between first shoulder 750c and second shoulder 750d includes first temporal support 722. First temporal support 722 is integrally formed with the body and is located immediately rearwardly of first shoulder 750c.

The portion of the body between second shoulder 750d and second end 750b includes a plurality of buttons 750h that extend horizontally outwardly from the exterior surface 750f. Buttons 750h are located at regular intervals from each other.

Fourth body section 746 is substantially identical to third body section 744 except that instead of having buttons 750h defined between the second shoulder and the second end, fourth body section 746 defines a plurality of apertures 750j that extend between the interior and exterior surfaces thereof. Apertures 750j are spaced at regular intervals from each other. In particular, the apertures 750j are spaced at intervals complementary to the spacing between buttons 750h on third portion section 744. Third body section 744 and fourth body section 746 are operatively engaged with each other by press-fitting buttons 750h into selected apertures 750j. The overall length of the component formed by engaging third and fourth body sections 744, 746 together is determined by the specific apertures 750j into which some of the buttons 750h are press-fitted.

As is best seen in FIG. 16, third and fourth body sections 744, 746 are arcuate components that are curved as mirror images of each other. When first body section 740 is operatively engaged with third body section 744, second body section 742 is operatively engaged with fourth body section 746, and third and fourth body sections 744, 746 are operatively engaged with each other, base 716 is formed and the base 716 is U-shaped when viewed from above.

Device 714 is used in a substantially identical manner to all other eyeglass-supporting devices described herein. The base 716 is positioned on the head 12 so that it circumscribes a portion of the head 12. In particular, base 716 passes behind the back 12b of the person's head and the first and second front supports 718, 720 are rearward of the eyebrows 12d and laterally spaced from the temples 12g. The eyeglasses 10 are engaged with device 714 by resting arms 10c, 10d on first and second front supports 718, 720 and passing arms 10c, 10d under first and second temporal supports 722, 724. This causes nose pads 10f of eyeglasses 10 to be lifted off the person's nose 12e and may result in the arms 10c, 10d being lifted a short distance off the ears 12f.

Figure 17:
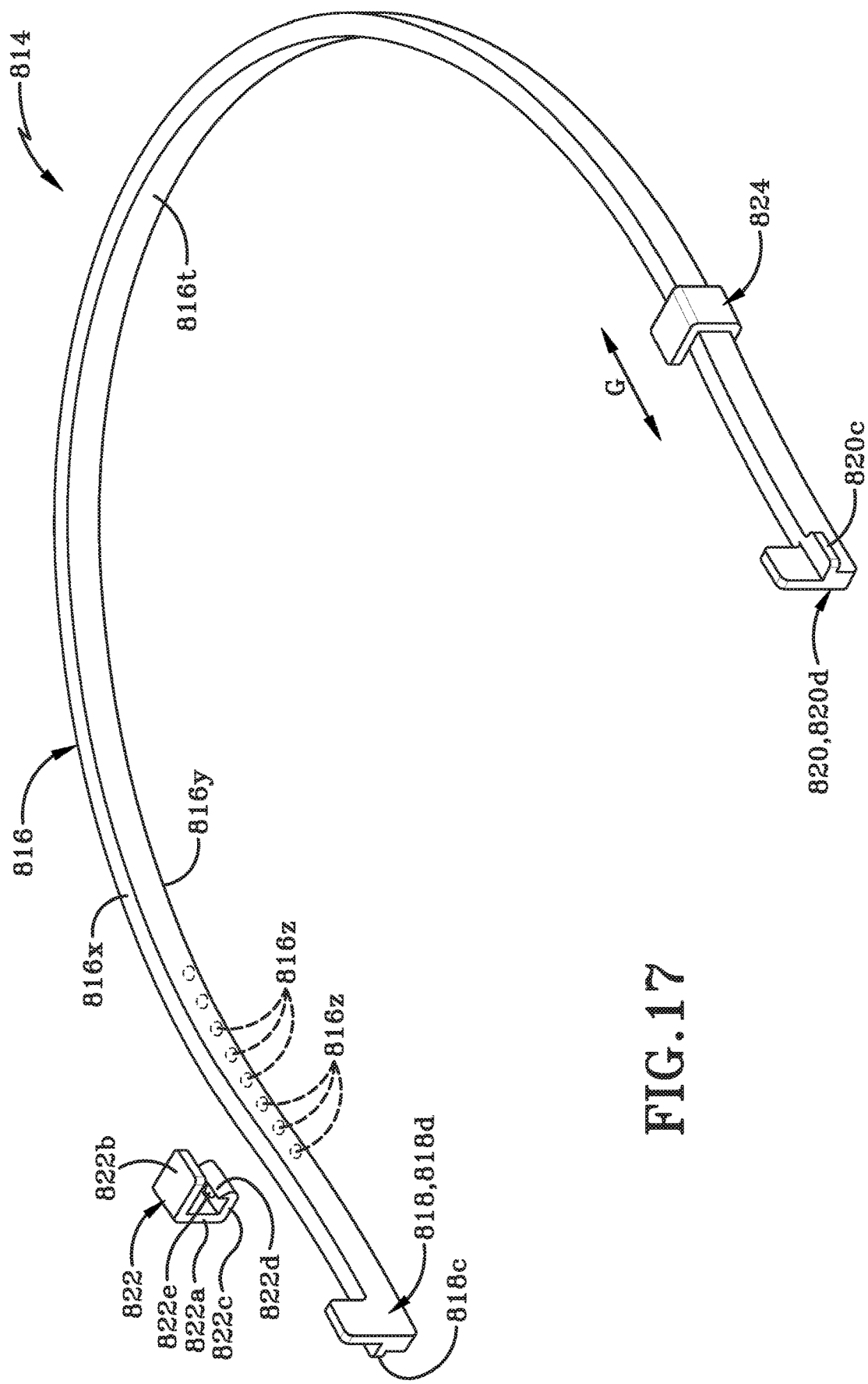
FIG. 17 is a top, front, perspective view of a ninth embodiment of the eyeglass retention device shown on its own, and showing an adjustable first temporal support selectively engaged therewith.

FIG. 17 shows a ninth embodiment of an eyeglass retention and suspension device in accordance with the present disclosure, generally indicated by the reference number 814. Device 814 is an adjustable version of the device 614 shown in FIG. 12. Device 814 is comprised of a base 816, first and second front supports 818, 820, and first and second temporal supports 822, 824. Device 814 is substantially identical to device 614 except for the configuration of first and second temporal supports 822, 824 and the manner in which these temporal supports engage the base 816.

Base 816 is substantially U-shaped when viewed from above and is of a constant height from first front support 818 to second front support 820. First and second front supports 818, 820 are integrally formed with the wall that comprises the rest of base 816. As such, the inner surface 818d, 820d of first and second front supports 818, 820 is flush with the inner surface 816t of the rest of base 816. The height between upper surface 816x and lower surface 616y is substantially constant between first front support 818 and second front support 820. A horizontal arm 818c, 820c extends outwardly from the outer surface of each of the first front support 818 and second front support 820, respectively. Arms 818c, 820c are shown positioned slightly above the upper surface 816x of base 816. Other positions for arms 818c, 820c may be utilized in other examples.

Base 816 differs from base 616 in that a plurality of recesses 816z is defined in lower surface of base 816y. A first plurality of the recesses 816z is spaced a distance rearwardly of first front support 818 and a second plurality of recesses 816z (not shown) is spaced a distance rearwardly of second front support 820. Recesses 816z are spaced at intervals from each other. Recesses 816z are provided to provide a way for first and second temporal supports 822, 824 to be adjustably engaged with base 816 as will be described hereafter.

First and second temporal supports 822, 824 are of a different configuration relative to all of the temporal supports previously described herein. First and second temporal supports 822, 824 are identical to each other. First temporal support 822 is described in detail and it will be understood that the description applies equally to second temporal support 824. First temporal support 822 is substantially C-shaped and includes a vertical outer leg 822a, a horizontal upper leg 822b, a horizontal lower leg 822c, and a vertical inner leg 822d. Upper and lower legs 822b, 822c are vertically spaced from each other and each originates in outer leg 822a and extends outwardly therefrom in the same direction. Upper leg 822b is longer than lower leg 822c and therefore extends further from outer leg 822a. Inner leg 822d originates in lower leg 822c and is shorter than outer leg 822a. Consequently, a gap (not numbered) is defined between upper leg 822b and a top end of inner leg 822d. Legs 822a-822d bound and define an interior cavity into each a portion of base 816 is received. A detent 822e extends upwardly from a top surface of lower leg 822c and into this interior cavity. Detent 822e is complementary in shape and size to recesses 816z defined in base 816 and is configured to be selectively received within one of the recesses 816z and to thereby lock first temporal support 822 in a set position on base 816.

First temporal support 822 is snap-fittingly engaged with base 816 by manipulating a portion of base through the gap between upper leg 822b and inner leg 822d and into the interior cavity. First temporal support 822 may be slid along base 816, as is indicated by the arrow "G", to the desired position on base 816 and until detent 822e aligns with the one of the recesses 816z at that desired position. The user will then pinch upper and lower legs 822a, 822c together to cause detent 822e to slide into the one of the recesses 816z, thereby securing first temporal support 822 to base 816. If the user wishes to adjust the position of first temporal support 822, he or she will push upwardly and outwardly on the underside of the section of the upper wall the projects outwardly beyond the inner surface 816t to disengage first temporal support 822 from base 816. The user can then re-engage the first temporal support 822 with base 822 as previously described and move the same to a second desired position thereon.

Device 814 is placed on the person's head 12 in such a way that the base 816 passes around the sides and back 12b of the person's head 12. The first and second front supports 818, 820 are positioned adjacent but laterally spaced from the rearmost regions of the person's eyebrows 12d. The innermost edge of the upper leg of each of the first and second temporal supports 822, 824 contacts the person's head. The position of contact of the upper leg with the head 12 may be slightly forwardly of the ears 12, above the ears 12, or slightly rearwardly of the ears 12 because of the adjustability of the first and second temporal supports 822, 824 on base 816. Eyeglasses 10 are engaged with device 814 and are supported thereby in the same manner as described earlier herein with respect to device 14. In other words, the arms 10c, 10d pass under the lower surfaces of the part of the first and second temporal supports 822, 824 that extends inwardly from the base 816. The arms 10c, 10d also pass over the upper surfaces of the horizontal arms 818c, 820c on the first and second front supports 818, 820. The engagement of eyeglasses 10 and device 814 results in nose pads 10f being lifted off the nose 12e and may result in the arms 10c, 10d being lifted a short distance off the ears 12f.

Figure 18:
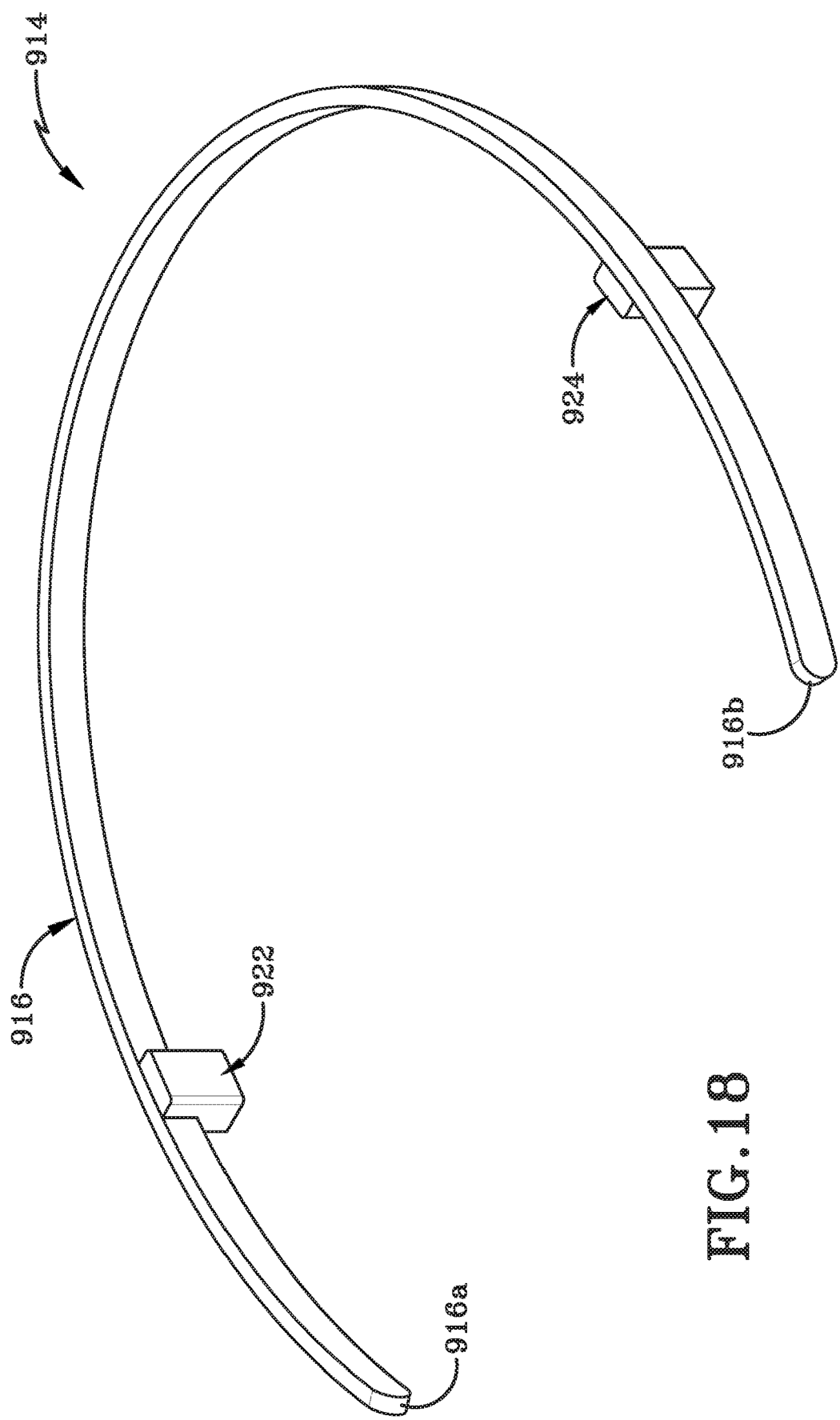
FIG. 18 is a top, front, perspective view of a tenth embodiment of the eyeglass retention device shown on its own.
Figure 19:
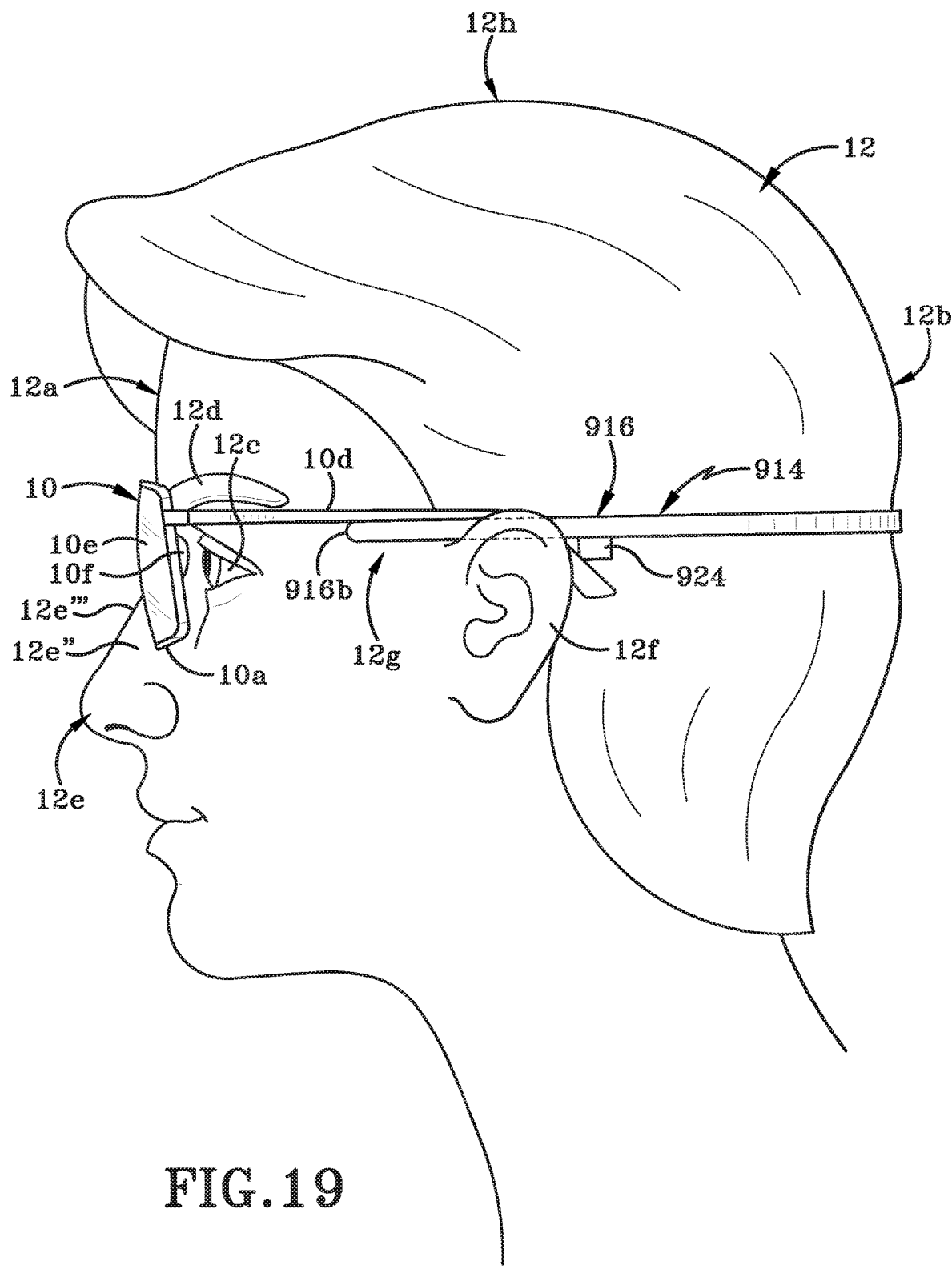
FIG. 19 is a left side elevation view of the eyeglass retention device of FIG. 19 being used to retain and suspend a pair of eyeglasses on a person's head.

Referring to FIGS. 18 and 19, there is shown a tenth embodiment of an eyeglass retention and suspension device in accordance with the present disclosure, generally indicated by the reference number 914. Device 914 is a variation of device 614 and is substantially identical relative thereto except for particular features which will be described hereafter. Device 914 is comprised of a base 916 and first and second temporal supports 922, 924. Device 914 is different from device 614 in that the first and second front supports are omitted therefrom. Instead, base 914 has a first terminal end 916a and a second terminal end 916b that are gently rounded. Base 916 differs from base 616 in that the radius of curvature of the portions of base 916 located forwardly of first and second temporal supports 922, 924 is tighter. In other words, the base 916 curves inwardly to a greater degree in base 916 than in base 616. Consequently, the first and second terminal ends 916a, 916b are closer to each other than are the first and second front supports 618, 620. All other aspects of device 914 are identical to those of device 614.

Device 914 functions differently to the previous embodiments of the device because device 914 lacks first and second front supports and only includes first and second temporal supports 922, 924. As a result, outward forces similar to the forces indicated by arrow "A" (FIG. 3B) are not applied by device 914. Device 914 is placed on the person's head 12 in such a way that the base 916 passes around the sides and back 12b of the person's head 12. The first and second terminal ends 916a, 916b are positioned adjacent the person's temples 12g and may contact the same. The first and second temporal supports 922, 924 contact the person's head slightly rearwardly of the ears 12. Eyeglasses 10 are engaged with device 914 by resting portions of the arms 10c, 10d on the upper surface of base 916 rearwardly from the respective one of the first and second terminal ends 916a, 916b and then passing the arms 10c, 10d under the lower surfaces of first and second temporal supports 922, 924. The regions of the base 916 upon which the arms 10c, 10d rest, therefore act to lift the eyeglasses 10 off the nose 12e. The first and second temporal supports 922, 924 lock arms 10c, 10d in place on device 914. The regions of the base 916 contacted by arms 10c, 10d act as a fulcrum for the lifting motion on the eyeglasses 10 but the degree to which device 914 lifts eyeglasses 10 may be less than in the embodiments previously described herein. The engagement of eyeglasses 10 and device 914 results in nose pads 10f being lifted off the nose 12e and may result in the arms 10c, 10d being lifted a short distance off the ears 12f.

Figure 20:
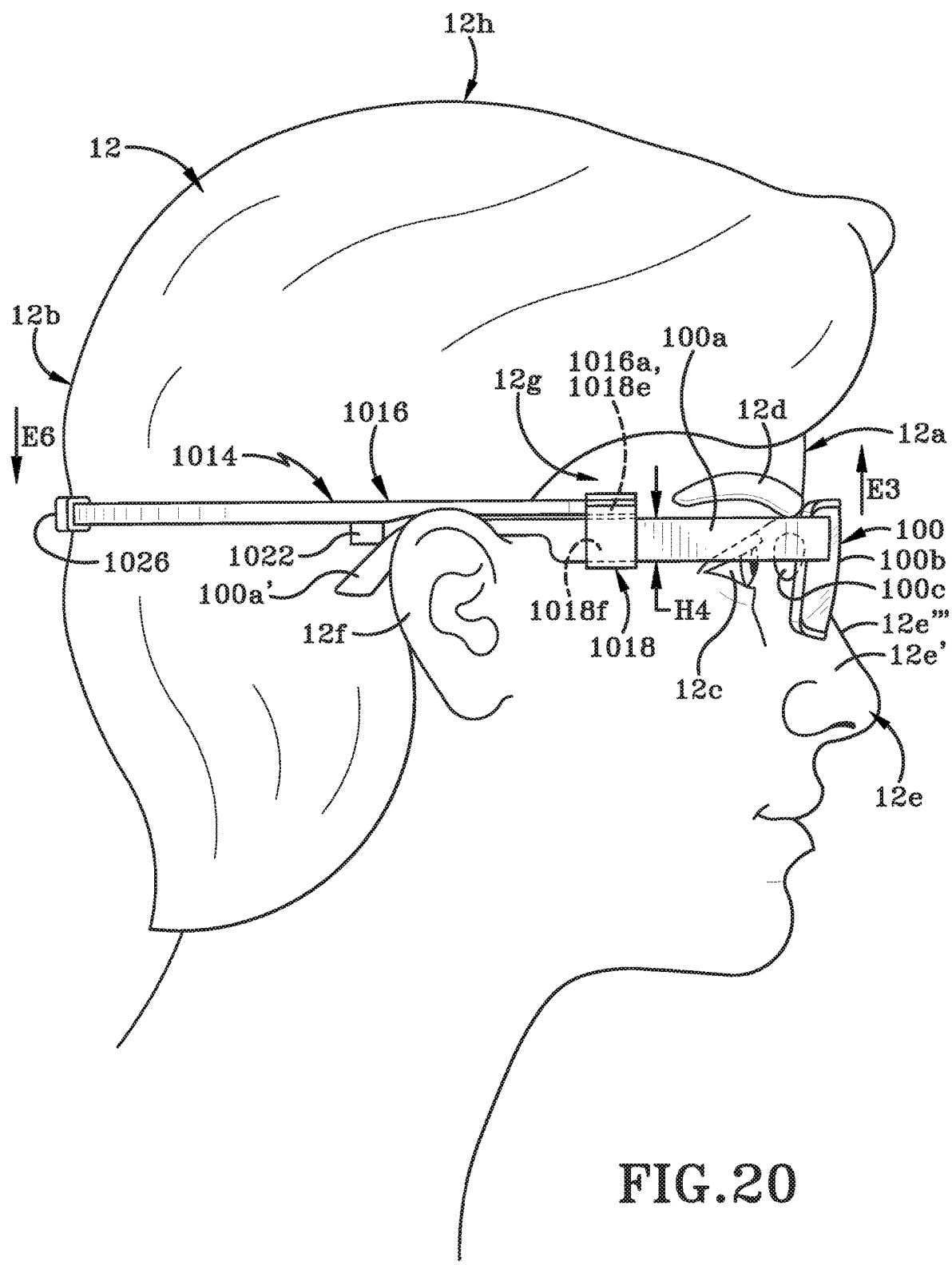
FIG. 20 is a right side elevation view of an eleventh embodiment of the eyeglass retention device being used to retain and suspend a smartglasses on a person's head.
Figure 21:
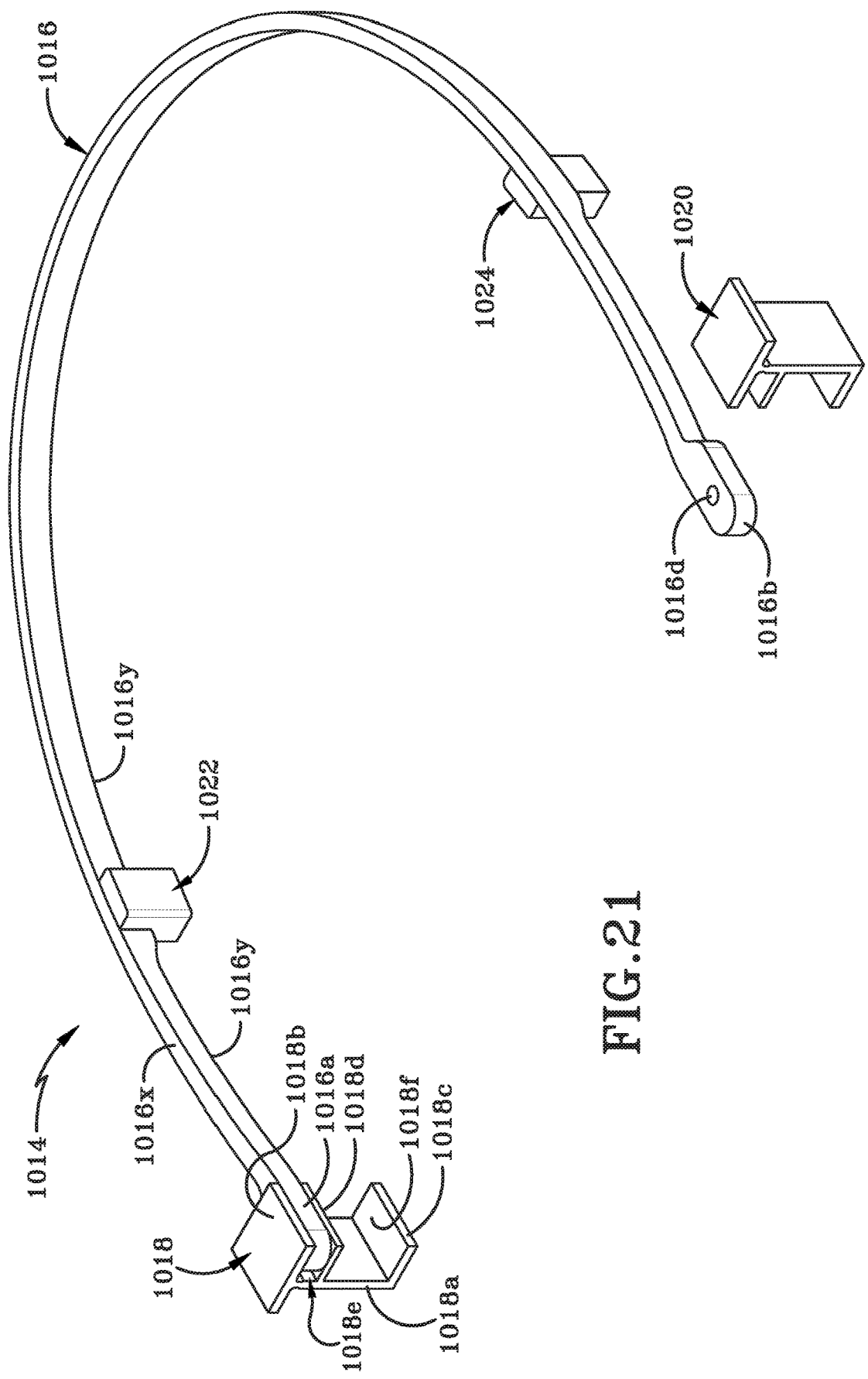
FIG. 21 is a partial, top, front, perspective view of the eyeglass retention device of FIG. 20 shown on its own, and shown the first front support in greater detail.
Figure 22:
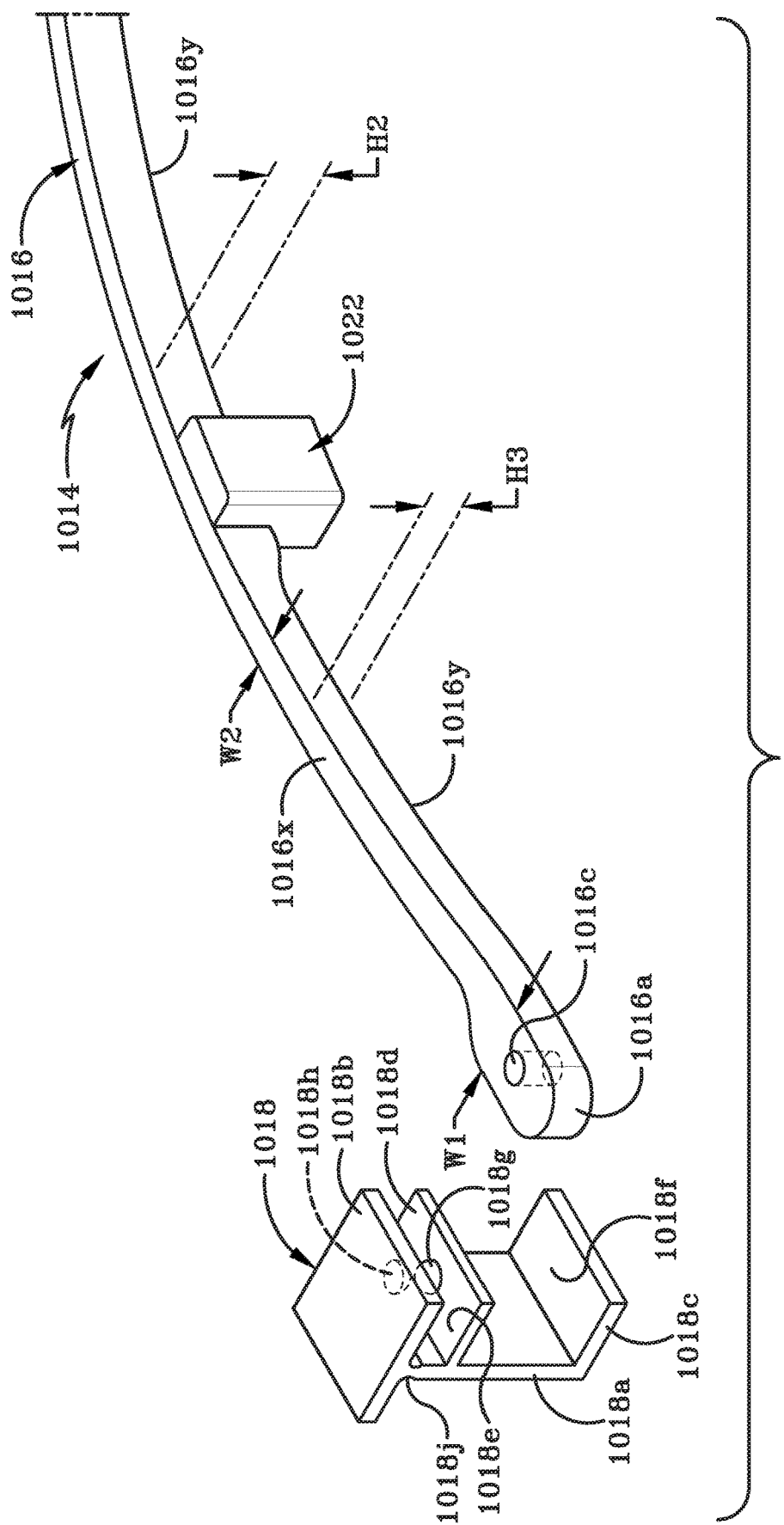
FIG. 22 is a partially exploded top, front perspective view of the eyeglass retention device shown in FIG. 20.

Referring to FIGS. 20-22, there is shown an eleventh embodiment of an eyeglass retention and suspension device in accordance with the present disclosure, generally indicated by the reference number 1014. Device 1014 is configured particularly to engage smartglasses instead of a typical pair of eyeglasses 10. The smartglasses are identified in these figures by the reference character 100. In particular, the smartglasses 100 are shown to be a type that will be positioned in front of only one eye 12c of the user. Smartglasses 100 includes an arm 100a and a lens 100b mounted at a first end of the arm 100a. The arm 100a includes a rear portion 100a' that is shaped to be received above an upper region of the person's ear 12f and angle slightly downwardly therefrom. At least one nose pad 100c is provided to contact the side 12e' of the person's nose 12e when the smartglasses 100 are worn.

Device 1014 includes a base 1016, a first front support 1018, and a first temporal support 1022. Base 1016 is a generally U-shaped member that is configured to pass around the back 12b of the user's head 12. Base 1016 has a first terminal end 1016a (FIG. 22) and a second terminal end 1016b. First and second terminal ends 1016a, 1016b are substantially identical in configuration and function but are arranged as mirror images of each other. The height of base 1016 is measured between upper surface 1016x and lower surface 1016y and is indicated by the reference character "H2" (FIG. 22). First terminal end 1016a and second terminal end 1016b are of a lesser height than the rest of base 1016. That lesser height is indicated by the reference character "H3". The upper surface of each terminal end 1016a, 1016b is flush with the upper surface 1016x but the lower surface of the terminal ends 1016a, 1016b is located upwardly from lower surface 1016y. Proximate the leading ends thereof, first and second terminal ends 1016a, 1016b are of a width "W1" measured between the inner surface and outer surface thereof. The rest of base 1016 is of a width "W2", where "W2" is smaller than "W1".

As shown in FIG. 22, first terminal end 1016a defines an aperture 1016c therein that extends from the upper surface of the first terminal end 1016a through to the lower surface thereof. Similarly, second terminal end 1016b defines an aperture 1016d therein. The configuration of the first and second terminal ends 1016a, 1016b allows for selective engagement of the front support 1018 therewith. The user will select one of the first and second terminal ends 1016a, 1016b of base 1016 with which to engage front support 1018, depending on which of the person's eyes 12c the smartglasses 100 is to be positioned in front of. FIG. 20 shows smartglasses 100 in front of the person's right eye 12c and therefore the front support 1018 is engaged with the right side terminal end of the base 1016, i.e., first terminal end 1016a. If the smartglasses 100 is to be positioned in front of the person's left eye, then the front support 1018 will be engaged with the left side terminal end of the base 1016, i.e., with the second terminal end 1016b.

FIG. 22 shows the front support 1018 in greater detail. Front support 1018 includes a vertical leg 1018a, an upper leg 1018b, a lower leg 1018c, and an intermediate leg 1018d. When viewed from the front, front support 1018 is generally "E-shaped". Upper leg 1018b extends laterally outwardly beyond an inner surface and an outer surface of the vertical leg 1018a. Each of the lower leg 1018c and intermediate leg 1018d originates in the vertical leg 1018a and extends for a distance outwardly therefrom. As illustrated, each of the upper leg 1018b, lower leg 1018c, and intermediate leg 1018d terminates at a similar distance away from the inner surface of vertical leg 1018a.

A first space 1018e is defined between a lower surface of upper leg 1018b and an upper surface of the intermediate leg 1018d. A second space 1018f is defined between a lower surface of intermediate leg 1018d and an upper surface of lower leg 1018c. The first space 1018e is slightly larger than the height "H3" of first terminal end 1016a of base 1016. The second space 1018e is slightly larger than the height "H4" (FIG. 20) of smartglasses 100.

A first detent 1018g extends upwardly from the upper surface of intermediate leg 1018d and extends into first space 1018e. A second detent 1018h extends downwardly from the lower surface of upper leg 1018b and into the first space 1018e. The first and second detents 1018g, 1018h are vertically aligned with each other and are positioned to be able to be aligned with aperture 1016c defined in the first terminal end 1016 of base 1016 and to be received therein. (First and second detents 1018g, 1018h are also capable of being selectively aligned with the aperture 1016d defined in second terminal end 1016b of base 1016.

As best seen in FIG. 22, front support 1018 also include a living hinge 1018j where an upper end of vertical leg 1018a connects to upper leg 1018b. The living hinge 1018j enables upper leg 1018b to pivot to a small degree relative to vertical leg 1018a. This feature helps to make it possible to engage front support 1018 with base 1016. Front support 1018 is snap-fittingly engaged with base 1016 by sliding first terminal end 1016a into space 1018e. As the leading region of first terminal end 1016a contacts the curved surfaces of detents 1018g, 1018h, upper leg 1018b will flex slightly upwardly about living hinge 1018j and will return to its at-rest position once detents 1018g, 1018h are received in aperture 1016c. Front support 1018 is operatively secured to base 1016 by a friction fit.

If the user later decides to move smartglasses 100 into engagement with second terminal end 1016b instead, the user can push slightly downwardly on the edge of upper leg 1018b (i.e., on the edge remote from the intermediate and lower legs 1018c, 1018d). This downward pushing motion will pivot upper leg 1018b about hinge 1018j and thereby tend to make first space 1018e larger and lifts at least detent 1018h out of aperture 1016c. The first terminal end 1016a can then be withdrawn from space 1018e and front support 1018 can be engaged with second terminal end 1016b in the same manner as described earlier herein with respect to the engagement of front support 1018 with first terminal end 1016a.

The body of the arm 100a of smartglasses 100 is frictionally retained in second space 1018f of front support 1018. Smartglasses 100 and device 1014 therefore act as a unitary component. The arm 100a of smartglasses 100 extends rearwardly from front support 1018, over the ear 12f and under a portion of the lower surface of temporal support 1022. This arrangement helps to ensure a lifting motion "E3" (FIG. 20) on lens 100b of smartglasses 100, thus lifting nose pad 100c off the side 12e' of nose 12e. The weight of smartglasses 100 is carried by device 1014. A weight 1026 may be engaged with base 1016 to counterbalance the weight of smartglasses 100 and to help prevent smartglasses 100 from moving back into contact with the user's nose 12e. The user may also position device 1014 on the head 12 in such a way as to ensure that the smartglasses 100 do not contact the nose 12e.

Figure 23:
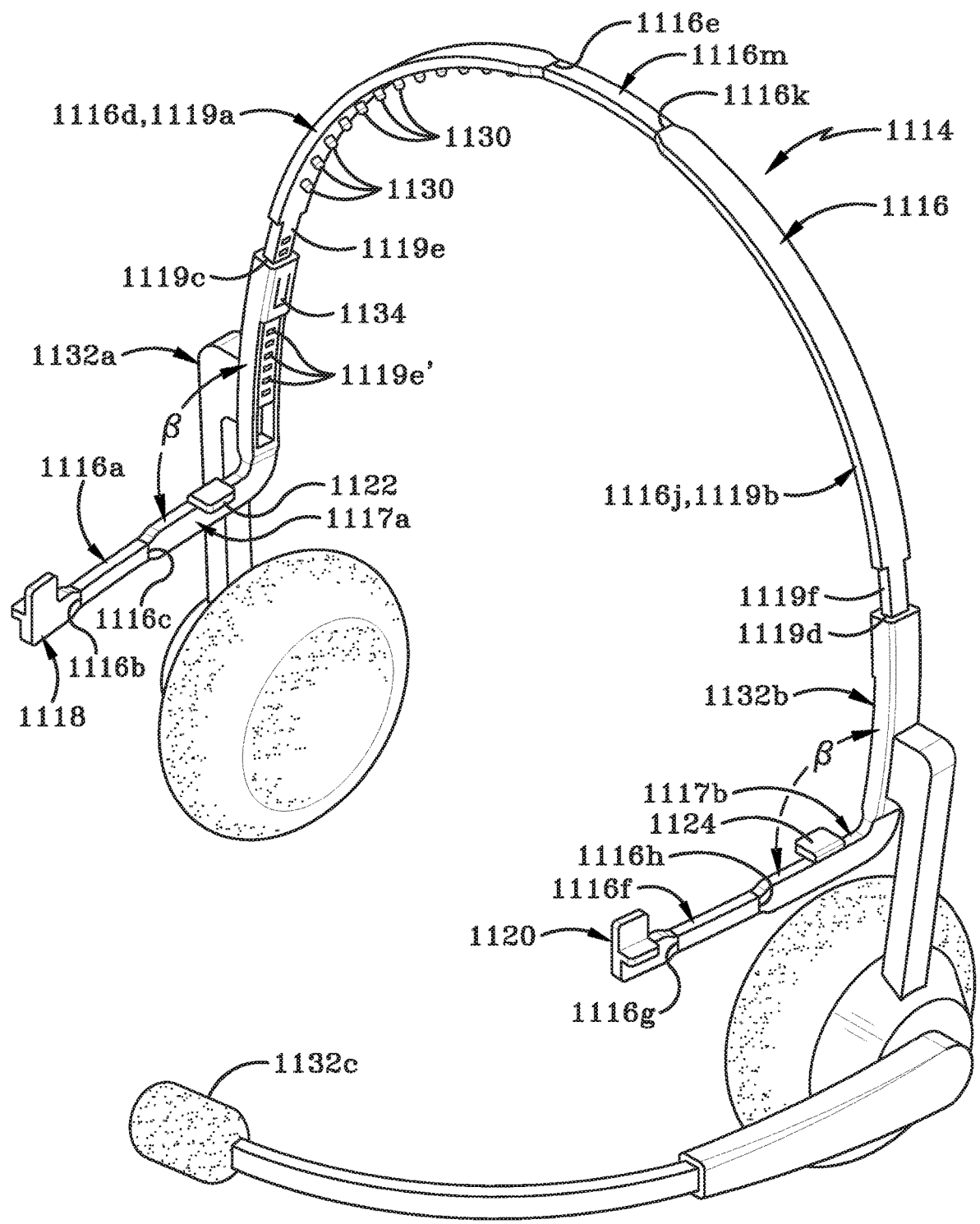
FIG. 23 is a top, front, perspective view of a twelfth embodiment of the eyeglass retention device shown on its own.

Referring now to FIG. 23 there is shown a twelfth embodiment of an eyeglass retention and suspension device in accordance with the present disclosure, generally indicated by the reference number 1114. Device 1114 is substantially identical in structure and function to device 414 except for differences that will be described hereafter. Device 1114 includes a base 1116, first and second front supports 1118, 1120, and first and second temporal supports 1122, 1124. First and second front supports 1118, 1120 are substantially identical in structure and function to first and second front supports 18, 20. First and second temporal supports 1122, 1124 are substantially identical in structure and function to first and second temporal supports 22, 24.

Base 1116 is substantially identical in structure and function to base 416 except for various features described hereafter. Base 1116 is generally U-shaped and includes a right front region 1116a having a first end 1116b and a second end 1116c. First front support 1118 is operatively engaged with first end 1116b and extends forwardly therefrom. A right arm region 1116d extends from second end 1116c to a rear end 1116e. Base 1116 further includes a left front region 1116f having a first end 1116g and a second end 1116h. Second front support 1120 is operatively engaged with first end 1116g and extends forwardly therefrom. A left arm region 1116j extends from second end 1116h to a rear end 1116k. A rear region 1116m extends between rear end 1116e and rear end 1116k.

Right arm region 1116d and left arm region 1116j are arcuate or curved in configuration and a forward portion of each is located in a first plane and a rearward portion of each angles upwardly therefrom. In particular, right arm region 1116d includes a forward portion 1117a and a rearward portion 1119a. The forward portion 1117a is located in the same plane as right front region 1116a. Rearward portion 1119a is oriented at an angle β relative to the forward portion 1117a. Similarly, the left arm region 1116j includes a forward portion 1117b and a rearward portion 1119b. The forward portion 1117b is located in the same plane as left front region 1116f (and right front region 1116a) and rearward portion 1119b of left arm region 1116j is oriented at an angle β relative to the forward portion 1117b thereof such that the rearward portion 1119b extends upwardly from forward portion 1117b. Nodules 1130 are provided on rearward portions 1119a, 1119b. The configuration of device 1114 is such that when worn by the person, the rearward portions 1119a, 1119b and rear region 1116m extend upwardly from proximate the upper regions of the person's ears 12f and over the top 12h of their head 12.

Device 1114, like device 414, includes and adjustment mechanism 1132 on one or both of rearward portions 1119a, 1119b. The adjustment mechanism 1132 may be of any construction that will enable the length of rearward portions 1119a, 1119b to be adjusted in length. As illustrated, a first section of rearward portion 1119a is integrally formed with forward portion 1117a. Similarly, a first section of rearward portion 1119b is integrally formed with forward portion 1117b. These first sections each define an interior bore that is accessible through an opening 1119c, 1119d. The second section of each of the rearward portions 1119a, 1119b is of reduced dimensions relative to the rest of the rearward portions 1119a, 1119b. The reduced dimension second section is identified by the reference numbers 1119e, 1119f, respectively. The second sections 1119e, 1119f are each provided with a plurality of locking ribs thereon, such as the ribs 1119e'. Each second section 1119e, 1119f is slidably received into the bores of the respective first sections of the rearward portions 1119a, 1119b through the associated opening 1119c or 1119f. The user may decrease the overall length of rearward portion 1119a, 1119b by pushing downwardly thereon and moving the second sections 1119e, 1119f further into the bores. The user may increase the overall length of the rearward portion 1119a, 1119b by pulling upwardly thereon and moving the second sections 1119e, 1119f further out of the bores. The locking ribs 1119e' will hold the rearward portions 1119a, 1119b at a set position. Pushing downwardly on the rearward portions 1119a, 1119b can simply be undertaken to reduce the overall length thereof. However, in order to withdraw the second sections 1119e, 1119f further outwardly from the bores and increase the overall length of the rearward portions 1119a, 1119b, the locking member 1134 first needs to be depressed to disengage the locking ribs 1119e'.

Device 1114 differs from device 414 in that the adjustment mechanism 1132 is an integral part of a headphone assembly. The headphone assembly includes a right earpiece 1132a and a left earpiece 1132b. A microphone 1132c may extend forwardly from one of the other of the right and left earpieces 1132a, 1132b. FIG. 23 shows microphone 1132c extending forwardly from left earpiece 1132b.

Device 1114 is placed on the person's head 12 in such a way that the second sections 1119a, 1119b and rear region 1116m pass over the sides and top 12h of the person's head 12 and the first and second front supports 1118, 1120 are positioned adjacent but laterally spaced from the rearmost regions of the person's eyebrows 12d. The first and second temporal supports 1122, 1124 contact the person's temples 12g slightly forward of the ears 12f. Right earpiece 1132a is positioned over the person's right ear 12f and left earpiece 1132b is positioned over the person's left ear 12f. The microphone is positioned in front of the person's mouth. Eyeglasses 10 are engaged with device 1114 and are supported thereby in the same manner as described earlier herein with respect to device 14. In other words, the arms 10c, 10d pass under the lower surfaces of the first and second temporal supports 1122, 1124 and over the upper surfaces of the horizontal arms on the first and second front supports 1118, 1120. The engagement of eyeglasses 10 and device 1114 results in nose pads 10f being lifted off the nose 12e and may result in the arms 10c, 10d being lifted a short distance off the ears 12f.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If the specification or a claim refers to "a" or "an" element, that does not mean there is only one of the element.

If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A device for moving eyeglasses off a person's nose, said device comprising:
   a base adapted to encircle at least part of a head of a person, wherein the base has a first end, a second end, and an inner surface and an outer surface extend between the first end and the second end, wherein the inner surface is proximate the person's head when the device is worn and the outer surface is remote from the person's head; and
   at least one support extending outwardly from the base and positioned to operatively engage an arm of eyeglasses worn by the person and to move the eyeglasses off the person's nose or off the person's ears, wherein the at least one support comprises:
   at least one front support proximate the first end of the base and extending laterally outwardly from one of the inner surface and the outer surface thereof; and
   at least one rear support extending laterally outwardly from the other of the inner surface and the outer surface of the base, said at least one rear support being located a distance away from the front support moving in a direction towards the second end of the base;
   wherein an upper surface of the at least one front support is adapted to receive a bottom surface the arm of the eyeglasses thereon;
   wherein a lower surface of the at least one rear support is adapted to receive a top surface of the arm of the eyeglasses thereunder such that the arm is balanced between the upper surface of the at least one front support; and
   wherein the lower surface of the at least one rear support, and at least one lens of the eyeglasses is positioned in front of the person's eyes.

2. The device according to claim 1, wherein the base is substantially U-shaped.

3. The device according to claim 1, wherein the base is all in one plane.

4. The device according to claim 1, wherein a forward portion of the base is located in a first plane and a rearward portion of the base angles downwardly away from the forward portion and is located below the first plane; and wherein the base is adapted to pass behind a back of the person's head.

5. The device according to claim 1, wherein a forward portion of the base is located in a first plane and a rearward portion of the base angles upwardly away from the forward portion and is located above the first plane; and wherein the base is adapted to pass over a top of the person's head.

6. The device according to claim 1, wherein the first end of the base is a first front end and the second end of the base is a second front end which is laterally spaced from the first front end; and the at least one rear support comprises:
   a first temporal support; and
   a second temporal support; wherein the first temporal support is located a distance inwardly from the first front end and the second temporal support is located a distance inwardly from the second front end; and wherein the first temporal support and the second temporal support extend toward each other and are adapted to contact the person's head proximate the person's ears.

7. The device according to claim 6, wherein the first temporal support and second temporal support are adjustable in position on the base.

8. The device according to claim 1, wherein the first end of the base is a first front end and the second end of the base is a second front end; and the at least one front support comprises:
   a first front support; and
   a second front support; wherein the first front support extends forwardly from the first front end and the second front support extends forwardly from the second front end; wherein the first front support and second front support extend outwardly from the base in opposite directions from one another, and wherein the first and second front supports are adapted to be positioned rearwardly of the person's eyebrows and proximate the person's temples.

9. The device according to claim 1, wherein the first end of the base is a first front end and the second end of the base is a second front end; and the at least one rear support comprises
   a first temporal support;
   a second temporal support; and
   wherein the at least one front support comprises a first front support; and
   a second front support;
   wherein the first front support extends forwardly from the first front end of the base and the second front support extends forwardly from the second front end of the base; and wherein the first temporal support is located a distance rearwardly of the first front support; and the second temporal support is located a distance rearwardly of the second front support.

10. The device according to claim 9, wherein the base is integrally formed with the first front support and the second front support.

11. The device according to claim 10, wherein the base is integrally formed with the first temporal support and the second temporal support.

12. The device according to claim 1, wherein the base comprises at least a first base section and a second base section that are adjustably engageable with each other.

13. The device according to claim 1, wherein the first end of the base is a first front end and the second end of the base is a second front end; and the at least one rear support comprises:
  a first temporal support;
  a second temporal support;
    wherein the first temporal support is located a distance rearwardly of the first front end of the base and the second temporal support is located a distance rearwardly of the second front end of the base; and
    wherein the at least one front support is selectively removably engageable with one or the other of the first front end and the second front end of the base.

14. The device according to claim 1, further comprising a weight engaged with the base.

15. The device according to claim 1, wherein the base further comprises a plurality of nodules that extend outwardly from the inner surface of the base and are adapted to contact the person's head.

16. The device according to claim 1, wherein the first end of the base is a first front end and the second end of the base is a second front end, and wherein the base has a length measured from the first front end to the second front end, and the length of the base is selectively adjustable.

17. The device according to claim 16, further comprising an adjustment mechanism operable to adjust the length of the base.

18. A method of moving eyeglasses off of a nose of a person or off the person's ears, said method comprising:
  placing a base of an eyeglass support device on a persons' head;
  encircling at least a portion of the person's head with the base;
  contacting a first side of the person's head with a first temporal support engaged with the base;
  contacting a second side of the person's head with a second temporal support of the base;
  providing a first front support on the base a distance forwardly of the first temporal support;
  engaging a first arm of eyeglasses worn by the person with the first temporal support by passing the first arm under a lower surface of the first temporal support;
  passing the first arm of the eyeglasses over an upper surface of the first front support;
  balancing the first arm between the upper surface of the first front support and the lower surface of the first temporal support; and
  moving the eyeglasses one or more of off the person's nose and off the person's ears.

19. The method according to claim 18, further comprising:
  providing a second front support on the base a distance forwardly of the second temporal support;
  engaging a second arm of the eyeglasses with the second temporal support;
  passing the second arm of the eyeglasses over an upper surface of the second front support; and
  balancing the second arm between the upper surface of the second front support and the lower surface of the second temporal support.

* * * * *